United States Patent [19]

Sakaibara et al.

[11] Patent Number: 5,485,559
[45] Date of Patent: Jan. 16, 1996

[54] PARALLEL GRAPHICS PROCESSOR WITH GRAPHICS COMMAND DISTRIBUTOR AND COMMAND SEQUENCING METHOD

[75] Inventors: Toru Sakaibara, Kawasaki; Ryoichi Takamatsu; Hideyuki Hara, both of Hitachi, all of Japan

[73] Assignee: Hitachi, Ltd., Tokyo, Japan

[21] Appl. No.: 712,934

[22] Filed: Jun. 10, 1991

[30] Foreign Application Priority Data

Jun. 13, 1990 [JP] Japan ................ 2-152816
May 15, 1991 [JP] Japan ................ 3-110122

[51] Int. Cl.$^6$ ........................................ G06T 1/00
[52] U.S. Cl. .................. 395/133; 395/162; 395/163; 395/800; 364/133
[58] Field of Search .................... 395/119, 120, 395/123, 126, 127, 129–132, 133, 141, 162, 163, 800; 364/DIG. 2, 131–133

[56] References Cited

U.S. PATENT DOCUMENTS

| | | | |
|---|---|---|---|
| 4,449,201 | 5/1984 | Clark | 364/DIG. 2 |
| 4,737,921 | 4/1988 | Goldwasser et al. | 395/163 X |
| 4,967,392 | 10/1990 | Werner et al. | 364/DIG. 2 |
| 5,010,515 | 4/1991 | Torbors, Jr. | 364/DIG. 2 |

OTHER PUBLICATIONS

David Kirk, et al., "The Rendering Architecture of the DN10000VS" Computer Graphics, vol. 24, No. 4, Aug. 1990, pp. 299–307.

John G. Torborg, "A Parallel Processor Architecture for Graphics Arithmetic Operations", Computer Graphics, vol. 21, No. 4, Jul. 1987, pp. 197–204.

James D. Foley, et al., "Computer Graphics Principles and Practice", Second Edition, 1990, pp. 872–882.

Primary Examiner—Almis R. Jankus
Attorney, Agent, or Firm—Fay, Sharpe, Beall, Fagan, Minnich & McKee

[57] ABSTRACT

A main processor sends to a command distribution device a series of graphic commands including an attribute command updating the state of the attribute which designates a display mode, and a primitive command defining graphics to be displayed. The command distribution device sequentially distributes the series of graphic commands to a plurality of geometry processors which process the graphics according to the type of command. The primitive command is sent to any one of plurality of geometry processors. At least those of the attribute commands which relate to the attributes of display used by the geometry processors are sent to all the geometry processors. The pixel commands comprising the outputs of those geometry processors are sent to a pixel processor which generates an image corresponding to the pixel commands. The pixel processor arranges pixel commands from the plurality of geometry processors on the basis of the data on the allocation of commands received from the command distribute means and then displays the graphic in the form of geometry data.

9 Claims, 23 Drawing Sheets

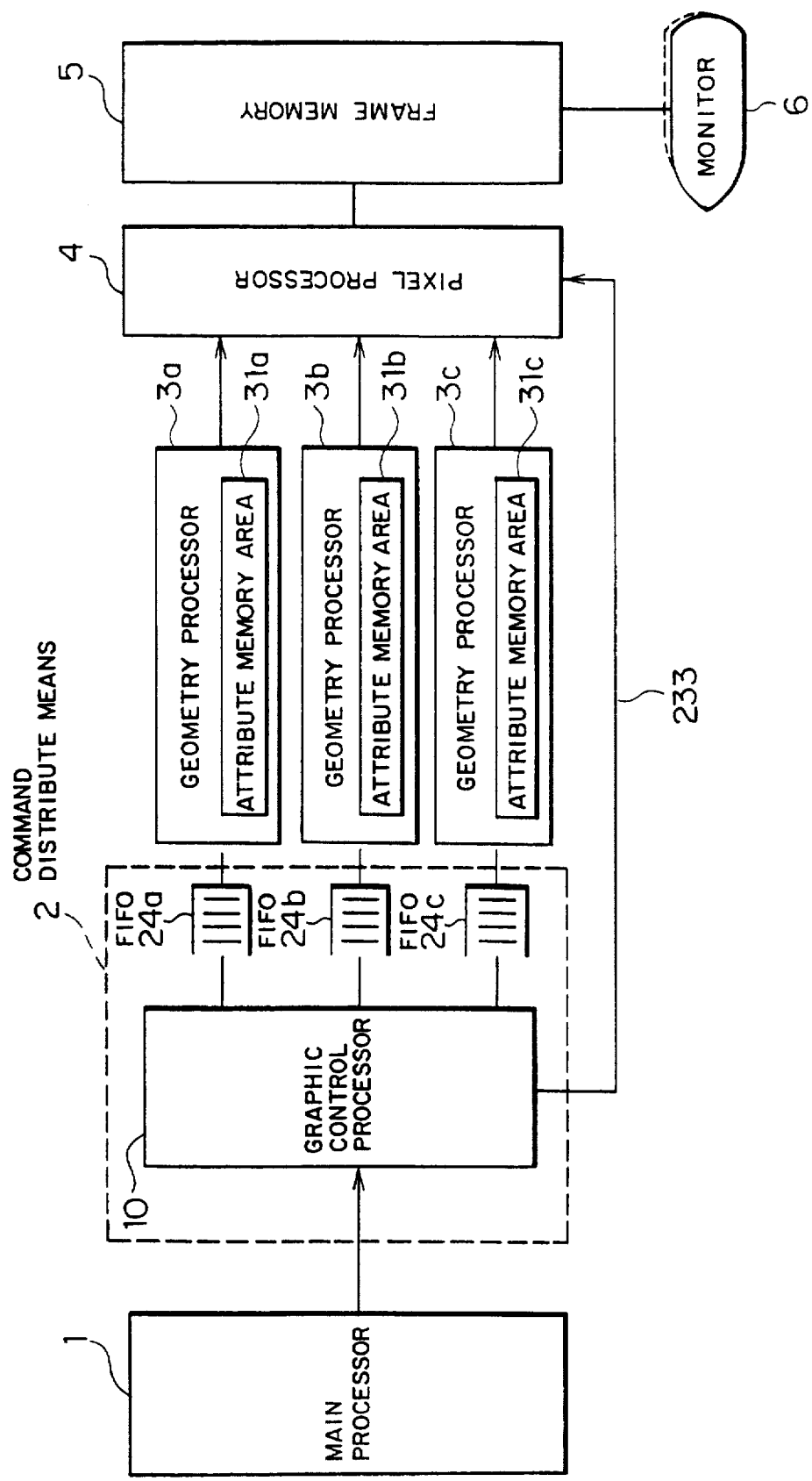

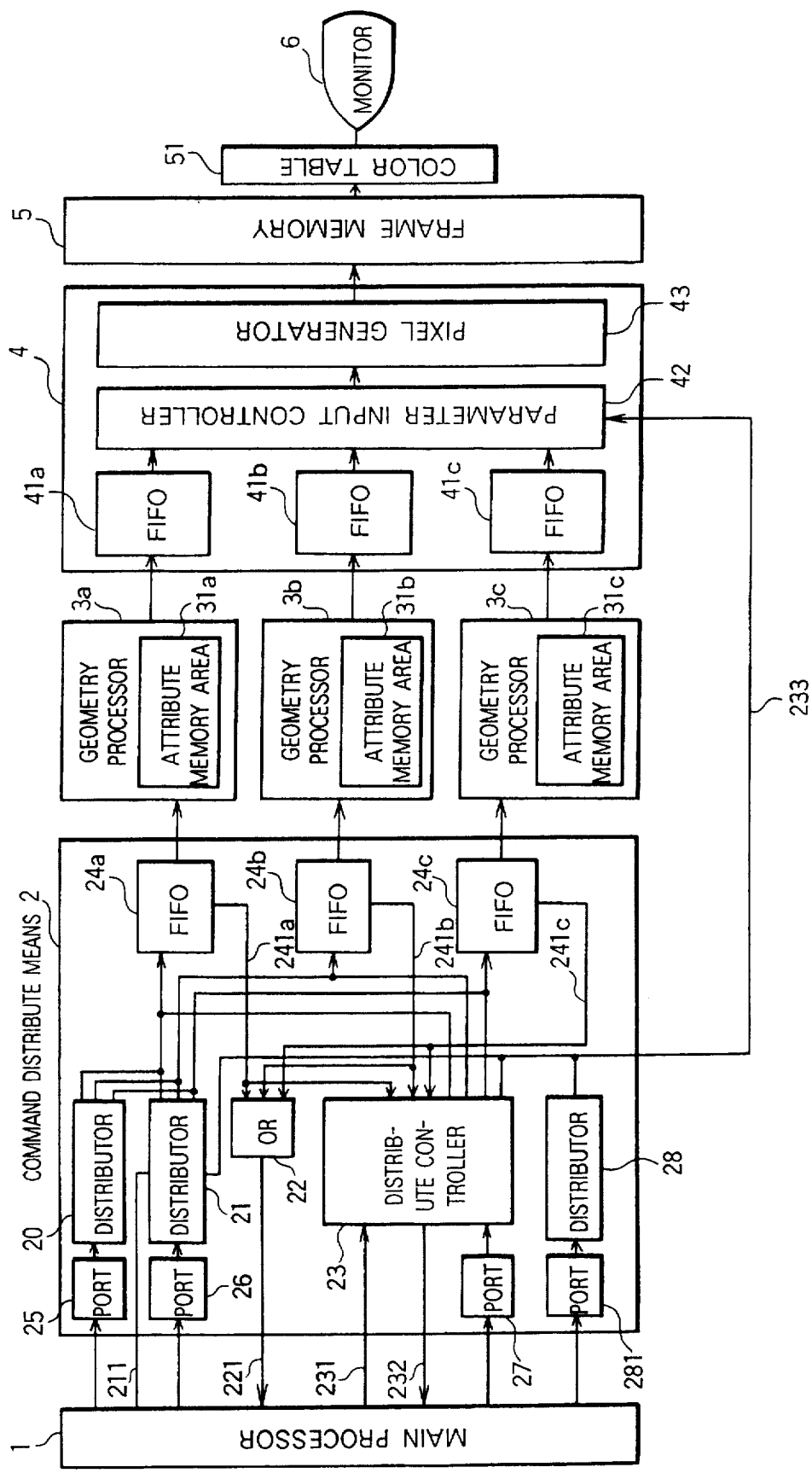

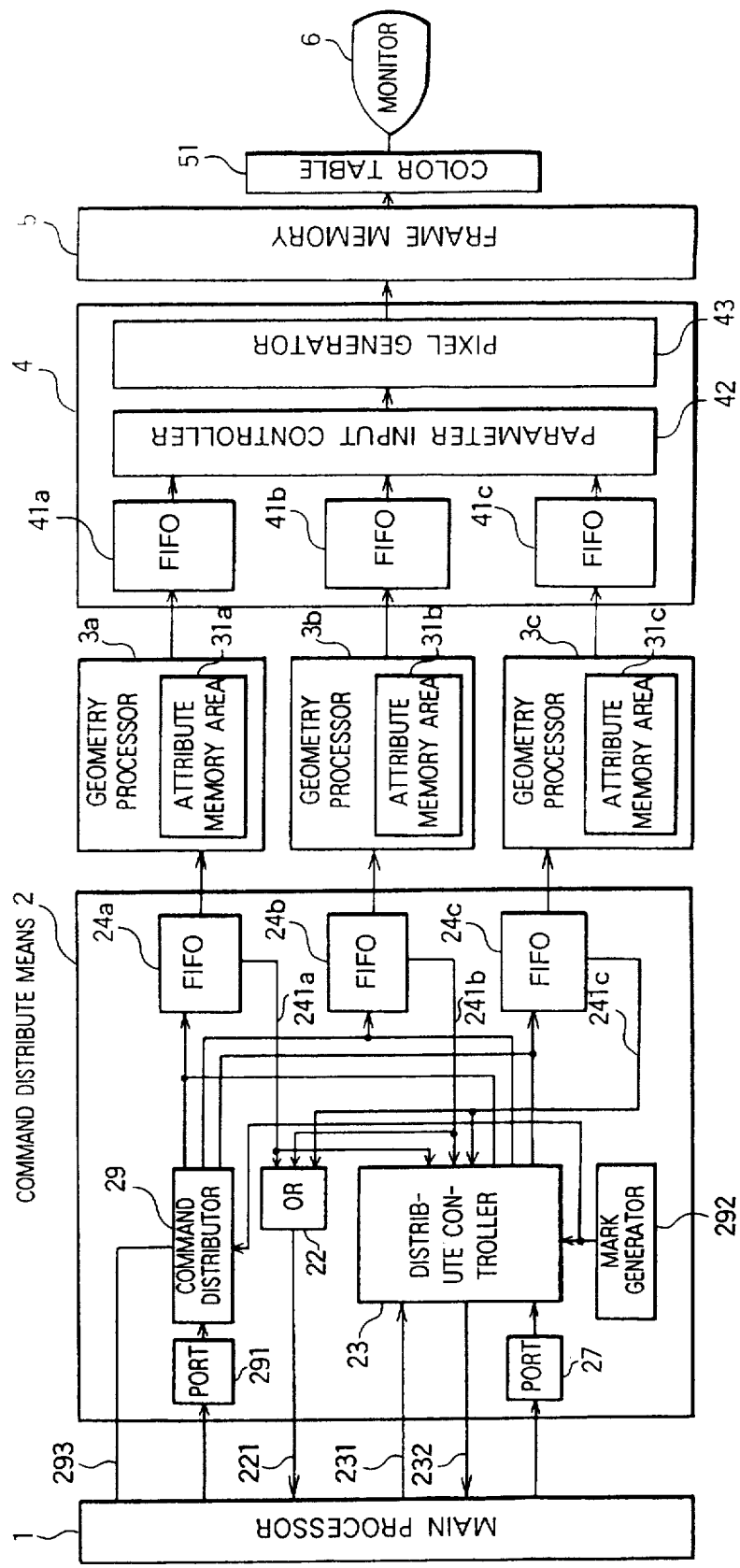

FIG. 2

DISPLAY COMMAND NUMBER

| # | |
|---|---|
| 1 | OP CODE / COLOR TABLE PARAMETER |
| 2 | OP CODE / VIEW TRANSFORMATION MATRIX PARAMETER |
| 3 | OP CODE / CLIP AREA |
| 4 | OP CODE / MODELING TRANSFORMATION MATRIX PARAMETER |
| 5 | OP CODE / LINE COLOR "RED" |
| 6 | OP CODE / LINE TYPE "CONTINUOUS LINE" |
| 7 | OP CODE / LINE WIDTH "1 DOT" |
| 8 | OP CODE |
| 9 | OP CODE |
| 10 | OP CODE |
| 11 | OP CODE / LINE COLOR "WHITE" |
| 12 | OP CODE |
| 13 | OP CODE / SURFACE REFLECTION "WHITE" |
| 14 | OP CODE / INTERIOR STYLE "HATCH" |
| 15 | OP CODE |
| 16 | OP CODE |
| 17 | OP CODE |
| 18 | OP CODE |
| 19 | OP CODE |

FIG. 3A
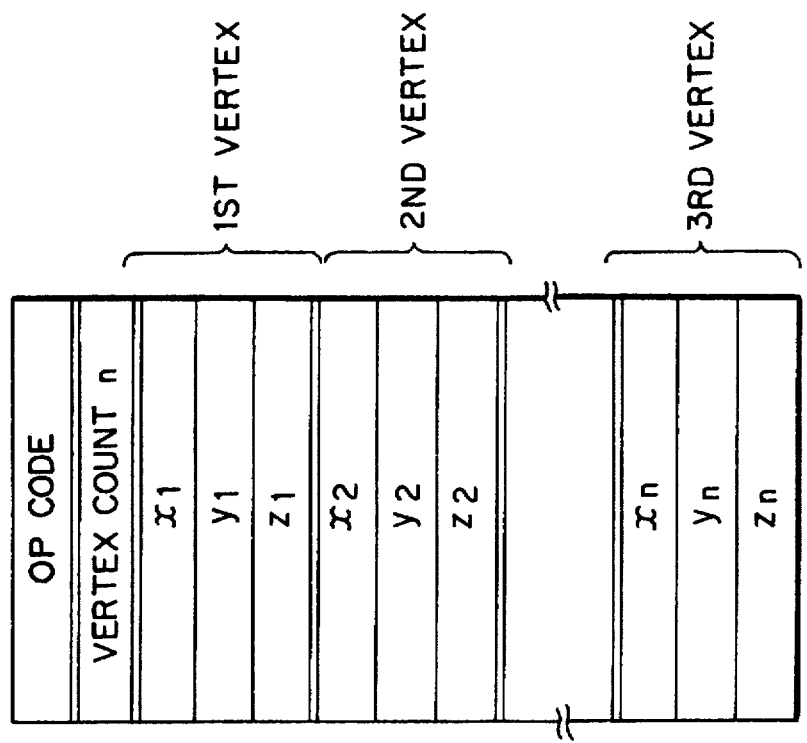
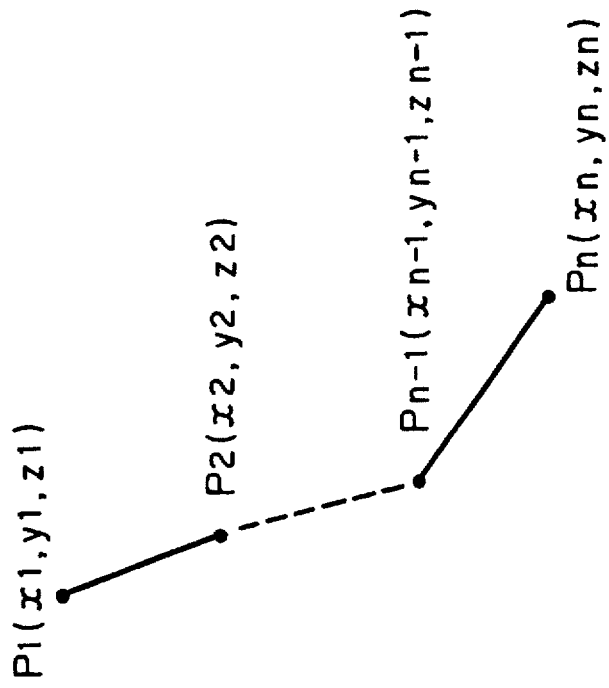

FIG. 5

COMMAND *2 TYPE  
PT : PRIMITIVE COMMAND  
AT(1) : TYPE (1) ATTRIBUTE COMMAND  
AT(2)-1 : TYPE (2)-1 ATTRIBUTE COMMAND  
AT(2)-2 : TYPE (2)-2 ATTRIBUTE COMMAND  
AT(3) : TYPE (3) ATTRIBUTE COMMAND

| GRAPHIC COMMAND No | GRAPHIC COMMAND | COLOR TABLE | VIEWING TRANS- FORM MATRIX | CLIP AREA | MODEL- ING TRANS- FORM MATRIX | LINE COLOR | LINE TYPE | LINE WIDTH | SURFACE REFLEC- TION INDEX | INTERIOR TYPE | COMMAND *2 TYPE |
|---|---|---|---|---|---|---|---|---|---|---|---|
| 1 | COLOR-TABLE | SET*1 | | | | | | | | | PT(3) |
| 2 | VIEW-TRANS | | SET*1 | | | | | | | | PT(1) |
| 3 | CLIPP-AREA | | | SET*1 | | | | | | | PT(2)_2 |
| 4 | MODELING-TRANS | | | | SET*1 | | | | | | PT(1) |
| 5 | LINE-COLOR | | | | | RED(5) | | | | | PT(2)_1 |
| 6 | LINE-TYPE | | | | | | SOLID LINE(6) | | | | PT(2)_1 |
| 7 | LINE-WIDTH | | | | | | | 1-DOT LINE(7) | | | PT(3) |
| 8 | POLY-LINE | | | | | | | | | | AT |
| 9 | LINE-COLOR | | | | | BLUE(9) | | | | | PT(2)_1 |
| 10 | POLY-LINE | | | | | | | | | | AT |
| 11 | LINE-COLOR | | | | | WHITE(11) | | | | | PT(2)_1 |
| 12 | POLY-LINE | | | | | | | | | | AT |
| 13 | S-REFLEC | | | | | | | | WHITE(13) | | PT(2)_1 |
| 14 | INTERIOR-STYLE | | | | | | | | | HATCHED (13) | PT(2)_2 |
| 15 | POLYGON | | | | | | | | | | AT |
| 16 | LINE-COLOR | | | | | BLUE(16) | | | | | PT(2)_1 |
| 17 | LINE-TYPE | | | | | | BROKEN LINE(17) | | | | PT(2)_1 |
| 18 | LINE-WIDTH | | | | | | | 2-DOT LINE(17) | | | PT(3) |
| 19 | POLY-LINE | | | | | | | | | | AT |

*1: SET TO A VALUE DESIGNATED WITH A PARAMETER OF GRAPHIC COMMAND

CAPACITY OF THE CHARACTER RECOGNITION DICTIONARY

CAPACITY OF THE INPUT IMAGE

FIG. 9

| ISSUED COMMAND No | GEOMETRY PROCESSOR 1 | GEOMETRY PROCESSOR 2 | GEOMETRY PROCESSOR 3 | TIME MARK | FETCH TARGET GEOMETRY PROCESSOR SELECTION SIGNAL | ATTRIBUTE COMMAND TYPE |
|---|---|---|---|---|---|---|
| 1 | c.t. | — | — | 1 |  | TYPE (3) |
| 2 | v.t. | v.t. | v.t. | 2 | — | TYPE (1) |
| 3 | c.a. | c.a. | c.a. | 3 | 1, 2, 3 | TYPE (2)-2 |
| 4 | m.t. | m.t. | m.t. | 4 | — | TYPE (1) |
| 5 | l.c. | l.c. | l.c. | 5 | — | TYPE (2)-1 |
| 6 | l.t. | l.t. | l.t. | 6 | — | TYPE (2)-1 |
| 7 | — | l.w. | — | 7 | 2 | TYPE (3) |
| 8 | — | — | p.l. | 8 | 3 | — |
| 9 | l.c. | l.c. | l.c. | 9 | — | TYPE (2)-1 |
| 10 | p.l. | — | — | 10 | 1 | — |
| 11 | l.c. | l.c. | l.c. | 11 | — | TYPE (2)-1 |
| 12 | — | p.l. | — | 12 | 2 | — |
| 13 | s.r. | s.r. | s.r. | 13 | — | TYPE (2)-1 |
| 14 | i.s. | i.s. | i.s. | 14 | 1, 2, 3 | TYPE (2)-2 |
| 15 | — | — | p.g. | 15 | 3 | — |
| 16 | l.c. | l.c. | l.c. | 16 | — | TYPE (2)-1 |
| 17 | l.t. | l.t. | l.t. | 17 | — | TYPE (2)-1 |
| 18 | l.w. | — | — | 18 | 1 | TYPE (3) |
| 19 | — | p.l. | — | 19 | 2 | — | c.t. : COLOR-TABLE COMMAND
v.t. : VIEW-TRANSFORMATION COMMAND
c.a. : CLIP-AREA COMMAND
m.t. : MODELING-TRANSFORMTION COMMAND
l.c. : LINE-COLOR COMMAND
l.t. : LINE-TYPE COMMAND
l.w. : LINE-WIDTH COMMAND
p.l. : POLY-LINE COMMAND
s.r. : SURFACE-REFLECTION COMMAND
i.s. : INTERIOR-STYLE COMMAND
p.g. : POLYGON COMMAND

*1: THE NAME OF A PIXEL PROCESSOR COMMAND INCLUDES AN ABBREVIATION OF THE CORRESPONDING GRAPHIC COMMAND OF FIG. 9 WITH "P" ATTACHED TO THE HEAD OF THE ABBREVIATION. THE "P.NOP" COMMAND IS A INVALID COMMAND

FIG. 10B

GEOMETRY PROCESSOR 1 OUTPUT

| INDIVIDUAL ISSUE No | COMMAND | TIME MARK |
|---|---|---|
| 1 | p.c.t. | 1 |
| 2 | p.c.a. | 3 |
| 3 | p.i.s. | 14 |
| 4 | p.ℓ.w. | 18 |

GEOMETRY PROCESSOR 2 OUTPUT

| INDIVIDUAL ISSUE No | COMMAND | TIME MARK |
|---|---|---|
| 1 | p.c.a. | 3 |
| 2 | p.ℓ.w. | 7 |
| 3 | p.p.ℓ. | 12 |
| 4 | p.i.s. | 14 |
| 5 | p.p.ℓ. | 19 |

GEOMETRY PROCESSOR 3 OUTPUT

| INDIVIDUAL ISSUE No | COMMAND | TIME MARK |
|---|---|---|
| 1 | p.c.a. | 3 |
| 2 | p.p.ℓ. | 8 |
| 3 | p.i.s. | 14 |
| 4 | p.p.g. | 15 |

RESULT OF COMMAND ARRANGING BY PIXEL PROCESSOR

| UNIFIED No | COMMAND | FROM |
|---|---|---|
| 1 | p.c.t. | 1 |
| 2 | p.c.a. | 1 |
| 3 | p.c.a. | 2 |
| 4 | p.c.a. | 3 |
| 5 | p.ℓ.w. | 2 |
| 6 | p.p.ℓ. | 3 |
| 7 | p.p.ℓ. | 2 |
| 8 | p.i.s. | 1 |
| 9 | p.i.s. | 2 |
| 10 | p.i.s. | 3 |
| 11 | p.p.g. | 3 |
| 12 | p.ℓ.w. | 1 |
| 13 | p.p.ℓ. | 2 |

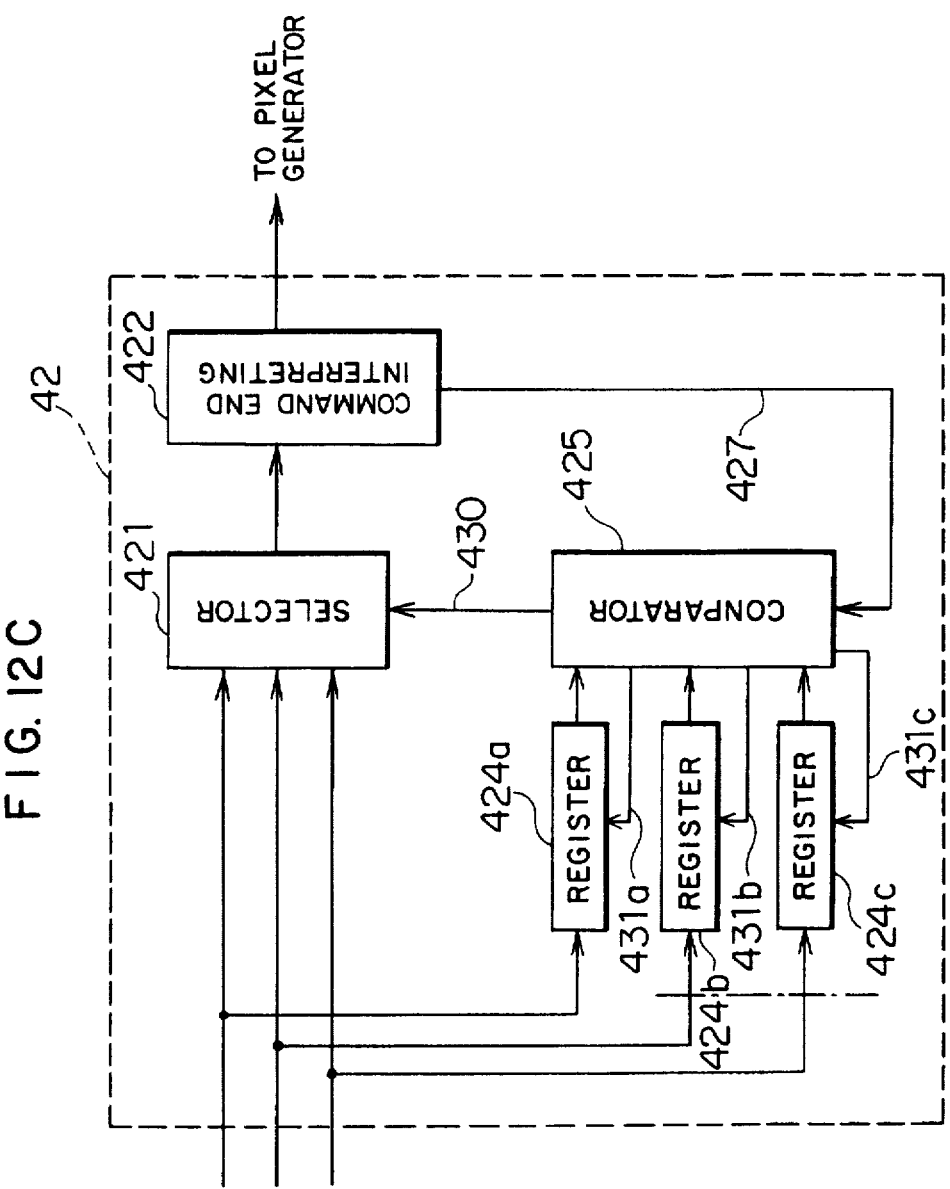
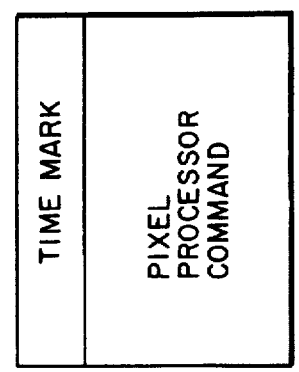

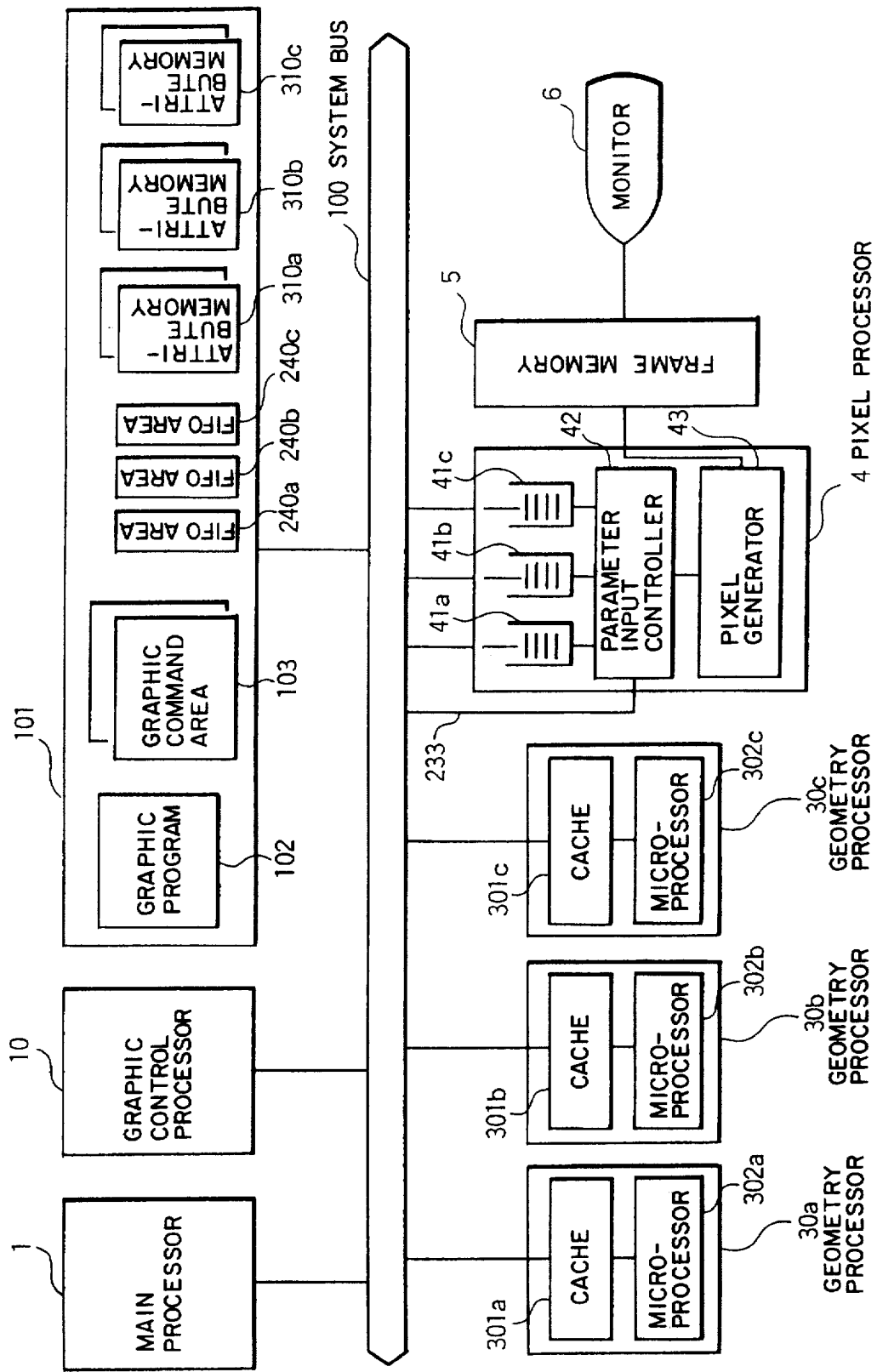

PARALLEL GRAPHICS PROCESSOR WITH GRAPHICS COMMAND DISTRIBUTOR AND COMMAND SEQUENCING METHOD

BACKGROUND OF THE INVENTION

The present invention relates to graphic display and more particularly to a graphic display method and apparatus for displaying graphics at high speed by parallel processing.

Graphic display processing generally includes display transversal which traces structured graphic data and which obtains a graphic command to designate a graphics, geometric processing including graphic coordinate transformation and clipping, and numerical processing such as intensity calculation using the equation of light reflection, and rendering for creating an image room geometrical information. In the present specification, geometrical processing such as graphic coordinate transformation and clipping, and numerical processing including intensity calculation using the equation of light reflection are referred to as graphic processing, which is one of the important factors to determine the graphic performance.

A first known conventional example is a graphic display device which performs graphic processing in a pipelined system to realize high speed display, as disclosed in Unexamined Japanese Patent Publication JP-A 64-992.

In this pipelined system, allocation of equal loads on the respective pipeline stages is difficult. If, especially, a heavy load is to be processed, graphic performance is limited by the stage concerned and other stages would be idle. Another problem is that transmission of information through the respective pipeline stages takes substantial time. Since the graphic display device usually processes various figures such as line segments and surfaces, it is required to determine the types of the figures at the respective pipeline stages and the time taken for this determination cannot be neglected.

Therefore, a system for processing a graphics using a plurality of processors in parallel is invented, as discussed in *Computer Graphics*, Vol. 24, No. 4 (Aug. 1990), pp. 299–307 as a second conventional example.

The system includes a plurality of processors (CPUs), a main memory, a rasterizing engine which produces an image from geometric information, a general I/O bus adapter, a main system bus connecting these elements, and an I/O unit. Graphic commands produced by some of the plurality of processors are sequentially allocated to other processors to perform the graphic processing operation. The result of this processing operation is delivered to the rasterizing engine where an image is produced and displayed.

In this case, since all the stages of the series of the graphic processing operations are performed by one processor, it does not occur that other processors become idle especially due to the processing of a heavy load as in the pipelined system. No transfer of data between the processors and no determination of the kind of a graphic are required at each processing operation to thereby realize high speed display.

For an attribute command designating the manner of display, a processor which has processed this command delivers the result to all other processors in order to reflect the result of the processing to other processors so as to prevent disorder in the attributes. To this end, the first-mentioned processor is required to be synchronized with other processors to thereby render the processing complicated and hence take substantial time for that processing.

Since the graphic commands are sequentially allocated to the processors, the loads on some processors increase to thereby reduce the overall performance if the times required for processing the graphic commands are greatly uneven.

A method of processing a graphics with a plurality of processors is known as a third conventional example, as discussed in *Computer Graphics*, Vol. 21, No. 4, (July 1897), pp. 197–204. The display list manager which delivers a graphic command to graphics arithmetic processors which process the graphics attaches a control bit indicative of the kind of a command and a method of control to the head of the graphic command and sends the result to the input bus. The graphics arithmetic processors take commands on the bus with priorities corresponding to the loads to be processed, refers to the control bit of the taken command, determines whether the command should be processed and processes a necessary command. When the graphics arithmetic processors output a signal, the processors determine an appropriate timing for the output. If the timing is too early, the processor delays sending the data to an image memory unit. According to this method, a display list manager produces the control bit, and adds it to the graphic command. The graphics arithmetic processor must refer to the control bit, determine the processing, and manage the output timing. As described above, the graphics arithmetic processors are dispersed and control the entire operation of the system, so that processing and hardware tend to be complicated.

SUMMARY OF THE INVENTION

It is an object of the present invention to provide a graphic display method and apparatus capable of performing a parallel operation with simple hardware.

It is another object of the present invention to provide a graphic display method and apparatus which is capable of preventing disorder of the attributes and of the order of display by parallel processing using simple hardware when a plurality of processors share parallel display processing of a unit graphic since high speed graphic display is required and the result is displayed on a single image generator.

It is a further object of the present invention to provide a graphic display method and apparatus which is capable of displaying graphics at high speed by parallel processing on a graphic display processor which comprises a plurality of processors without causing any disorder of display attributes and the order of display.

In order to achieve the above objects, in the present invention, all processors which execute graphic processing (hereinafter referred to as geometry processors) process attribute commands necessary for the geometry processors such that some of the geometry processors are not required to broadcast the result of the processing of the attribute commands to other geometry processors, store the last attribute information in their respective attribute storage areas and perform a processing operation on the basis of the data.

Other graphic commands are allocated to geometry processors which have a relatively light load. If the order of processing primitive commands is to be maintained, a pixel processor which produces an image from geometry data which is the output of the geometry processors arranges the processing sequence. The control of those operations is not performed by the dispersed geometry processors, but the command distribute means and the pixel processor perform allocation of commands and arrangement of the processing operations together to thereby simplify the processing.

The graphic display apparatus according to the present invention comprises a main processor which produces graphic data to be displayed or a graphic command, command distribute means including a graphic control processor which receives and allocates that command, a plurality of geometry processors which receives and processes the allocated graphic commands in parallel, and a pixel processor which arranges the pixel commands obtained by the graphic processing of those geometry processors in a series of pixel commands corresponding to the order of the original graphic commands and draws the pixel commands as an image on a frame memory.

In this arrangement, basically, the command distribute means sends a primitive command to any one of the geometry processors and, sends an attribute command required by the geometry processors to all the geometry processors to thereby cause the respective geometry processors to perform the processing operations. The command distribute means grasps the state of the loads on the respective geometry processors from a quantity of data on unprocessed graphic commands and causes the geometry processors having relatively light loads to execute the processing.

If a series of graphic commands is inputted to the geometry processors in the arranging of pixel commands, the series of the pixel commands output by the geometry processors is predictable. Therefore, if the series of graphic commands is allocated to and processed by the geometry processors and if the pixel processor selects the geometry processors from which the pixel processor takes pixel processor commands using data on this allocation, the pixel processor can take the pixel processor commands in correct order. In the arrangement, when the command distribute means allocates graphic commands to the geometry processors, it sends data on the allocation or the data on identification of the allocated geometry processors to the pixel processor, which can arrange the order of processing of the pixel commands on the basis of that data.

Another arranging method may be such that the command distribute means attaches to the graphic command the corresponding time marks indicative of the order of generation of graphic commands when it sends the graphic commands to the geometry processors. When the geometry processors output pixel processor commands to the pixel processor, they also deliver the time marks to the pixel processor. The pixel processor processes the pixel processor commands with the earliest timing mark on the basis of those time marks.

While in the outline of the present invention the attribute commands are illustrated as being handled uniformly. Handling the attribute commands is required to be changed depending on the assignment of functions of the geometry processors and pixel processor or on the command system of the pixel processor commands. Processing the attribute commands in the present invention will be described below.

First, the attribute commands are classified depending on where the attribute data designated by the attribute commands is used:

(1) The attribute commands required by the geometry processors alone and not by the pixel processors. This is realized, for example, by designating a coordinate transformation matrix;

(2) The attribute commands required by the geometry processors and the pixel processor. Classification changes depending on a method of realization such as the allocation of processing by the geometry processors and the pixels processor or the frame works of the graphic commands and the pixel processor commands. The attribute data commands can be classified as follows:

(2)-1 The attribute commands which are not directly output as pixel processor commands to the pixel processor and which are contained in other pixel commands and output. This is realized here, for example, by a command to designate the color of a line segment;

(2)-2 The attribute commands output directly as pixel processor commands to the pixel processor. This is realized here, for example, by a command to designate how to fill a polygon out;

(3) The attribute commands which are not required to be processed by the geometry processors and used only by the pixel processor.

This is realized here, for example, by designating a color table.

These attribute commands are hereinafter referred to as attribute commands of type (1), (2)-1 and (2)-2 and (3) in the present specification.

In the present invention, the command distribute means sends the attribute commands of type (2)-1 and (2)-2 to all the geometry processors for processing purposes. The attribute command of type (3) is required to be sent directly to the pixel processor or to at least one geometry processor as in the primitive command. Of course, even if the attribute command is sent to all the geometry processors, it is processed normally although it occurs uselessly that the same pixel processor command is repeatedly sent to all the pixel processors and processed.

When the processing sequence is arranged on the basis of data in the allocated geometry processors, the command distribute means is required to send the above-mentioned allocation data to the pixel processor for output pixel processor commands of types (2)-2 and (3) or type (2)-2 only and comprising a primitive command and an attribute command, and to take the pixel processor command from the geometry processor on the basis of that allocated data.

Thus, in the plurality of geometry processors of the present invention, all the approximate attribute commands for at least the attributes which the geometry processors require are processed and the latest attribute data is stored at all times. Therefore, when a primitive command is processed, correct attribute data can be used. Thus, there does not occur disorder in the attributes. Since the series of attribute commands except for the primitive commands not allocated in the series of graphic commands is all processed, there occurs no disorder in the relationship between the attribute command and the primitive command and especially in the sequential relationship. Thus, display is made with correct attributes.

Since the command distribute means allocates the primitive commands to geometry processors having a relatively light load, the loads on the geometry processors are equalized to thereby achieve efficient parallel processing.

The command distribute means delivers to the pixel processor data on the manner of allocating to a geometry processor a graphic command which can be output as a pixel processor command or the data on identification of the allocated geometry processor. The pixel processor receives the results of the processing from the geometry processors in the sequence of the allocation on the basis of that data to thereby produce an image in correct sequence and hence to display the image in the defined sequence.

Even if no output to the pixel processor is required any longer, for example, when a graphics resulting form the processing of the primitive command by the geometry processor is outside the display range and no display is required, a pixel processor command indicative of that fact is sent to the pixel processor to prevent the pixel processor from wrongly taking the next pixel command. Thus no disorder occurs in the processing order.

As just described above, the command distribute means and the pixel processor cooperates to allocate commands and control the processing sequences, so that control is simplified.

BRIEF DESCRIPTION OF THE DRAWINGS

FIG. 1A is a system block diagram illustrating the basic structure of the present invention;

FIG. 1C is a block diagram of a second embodiment of the graphic display apparatus according to the present invention;

FIG. 1D is a block diagram of a third embodiment of the graphic display apparatus according to the present invention;

FIG. 2 schematically illustrates a graphic command used in each of the embodiments according to the present invention;

FIG. 3A schematically shows one illustrative form of a line segment string definition command used in each of the above embodiments;

FIG. 5 illustrates a transition of the attribute state of each of the embodiments of the inventive graphic display apparatus;

FIG. 9 schematically shows an illustrative output from a command distributor of the embodiment of the graphic display apparatus according to the present invention;

FIGS. 10A, 10B each schematically illustrates the arrangement of input commands to the pixel processor of the embodiments of the graphic display apparatus according to the present invention;

FIGS. 12A, 12B, 12C each are a block diagram of an embodiment of a parameter input controller in the pixel processor of the graphic display apparatus according to the present invention;

FIG. 13 schematically illustrates one form of a time-marked pixel processor command used in one embodiment of the graphic display apparatus according to the present invention;

FIG. 14 is a system block diagram of a fourth embodiment of the graphic display apparatus according to the present invention.

DESCRIPTION OF THE PREFERRED EMBODIMENTS

Figure 1B:
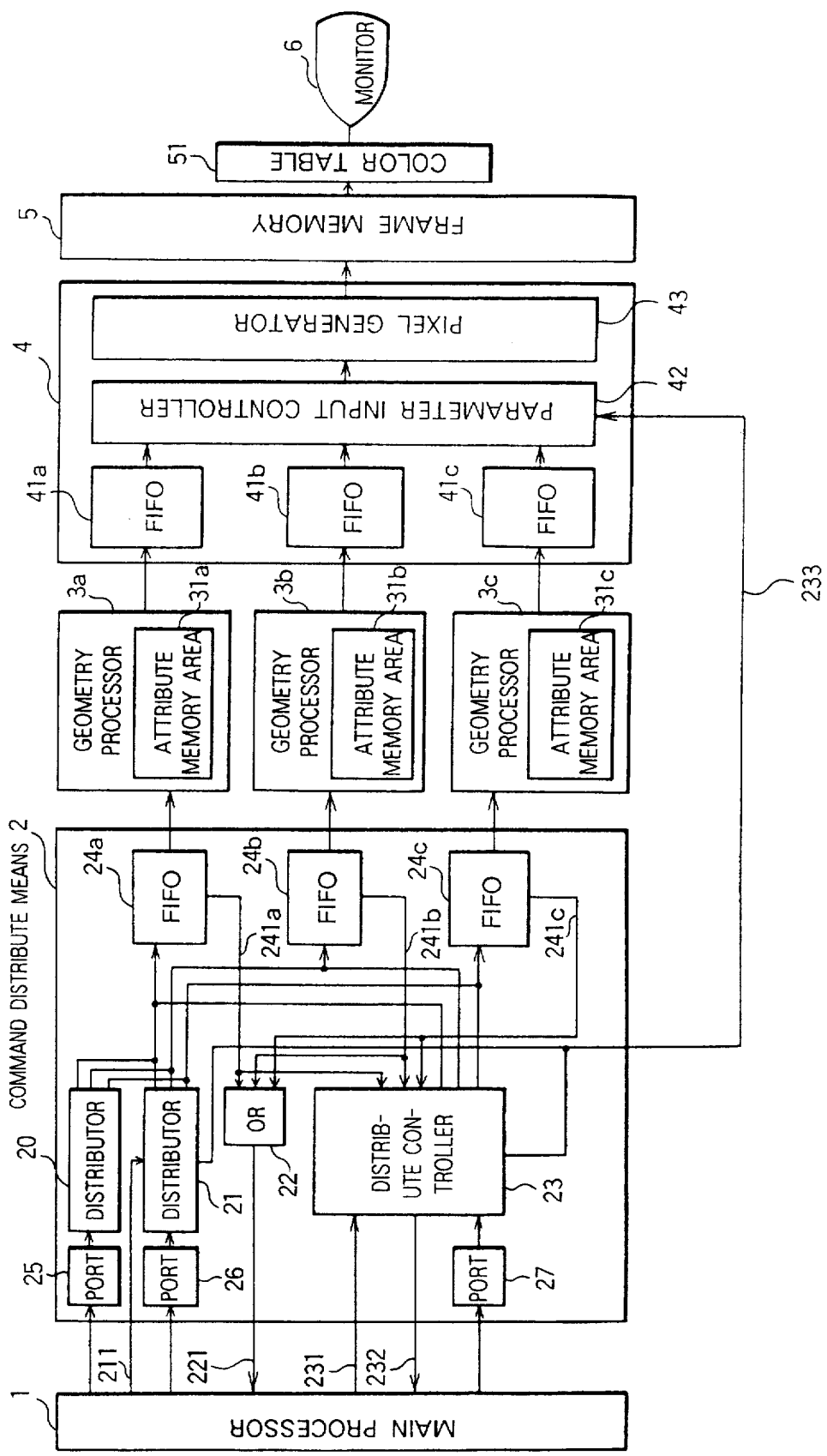
FIG. 1B is a block diagram of a first embodiment of a graphic display apparatus according to the present invention.

The present invention will now be described in detail with reference to the drawings.

The principles of a graphic display apparatus using parallel processing according to the present invention will be described with reference to FIG. 1A. In FIG. 1, reference numeral 1 denotes a main processor which produces graphic data to be displayed or a graphic command, sends it to a graphic control processor 10 of a command distribute means 2 and requests to display it. Graphic control processor 10 allocates graphic commands to geometry processors 3a–3c through at least one of FIFOs 24a–24c of command distribute means 2 for graphic processing purposes. Geometry processors 3a–3c shear processing a graphics, to be displayed, in parallel. (Normally, a plurality of graphics is displayed.) Geometry processors 3a to 3c have corresponding attribute memory areas 31a–31c to hold the latest attribute data executed in the geometry processors or data on designation of a clip area indicative of a coordinate transformation of a graphic or the range of display. The results of those graphic processing operations or the pixel processor commands are sent to pixel processor 4, where they are arranged in the order of a series of pixel processor commands corresponding to the order of the original graphic commands. The individual pixel commands constituting the series of commands are processed by pixel processor 4 and drawn as an image on frame memory 5, which is displayed on a monitor 6.

In this graphic display apparatus, graphic control processor 10 of command distribute means 2 sends a primitive command to any one of geometry processors 3a to 3c, sends a graphic attribute command to all or part of the geometry processors 3a–3c so as to be processed by the corresponding geometry processors, as will be described later in more detail, such that graphic attributes such as a coordinate transformation matrix executed for a graphics or a clip area are not disordered by reversal of the processing order by parallel processing, as mentioned above.

Graphic control processor 10 of commands distribute means 2 grasps the states of loads on the respective geometry processors 3a–3c from a quantity of data on unprocessed graphic commands and sends a primitive command to one of geometry processors 3a–3c having a relatively light load.

In the arrangement of the pixel processor commands, a pixel processor command is predictable which comprises a pixel processor command output from one of the geometry processors 3a–3c when a series of graphic commands is input to that processor. Therefore, when a series of graphic command is allocated to geometry processors 3a–3c and processed in the manner described above, and if pixel processor 4 selects a geometry processor from which the pixel processor 4 fetches a pixel processor command using the data on the allocation, as will be described in more detail, pixel commands can be fetched in correct sequence.

When graphic control processor 10 of command distribute means 2 allocates graphic commands to geometry processors 3a–3c, it sends data on that allocation, and data on the identification of the command-allocated geometry processor to pixel processor 4 as a fetch target geometry processor selection signal 233. Pixel processor 4 arranges the sequence of processing pixel processor commands on the basis of that information.

In another arranging method, when graphic control processor 10 of command distribute means 2 sends a graphic command to geometry processors 3a–3c, it may add a time mark indicative of the sequence of generation of the graphic command to the graphic command. When geometry processors 3a–3c output the results to pixel processor 4, they also deliver the time marks to pixel processor 4 such that pixel processor 4 processes the pixel processor command with the earliest time mark on the basis of the time mark, as will be described later in more detail.

An embodiment of the present invention will be described with reference to FIGS. 1B–14. First, graphic commands used in the present invention will be described.

As described above, the graphic command includes a primitive command which designates a graphics itself, and an attribute command which designates the manner of displaying the color of the graphic. The attribute command is classified into finer ones, as mentioned above.

FIG. 2 shows one illustrative graphic command from main processor 1. The first is a color_table command which sets the value of a color table to convert the data on the intensity of an image stored in the frame memory to the actual monitor intensity. The form of the command includes an operation (OP) code indicative of the type of the command and a color table parameter which designates the value of the color table. This is an attribute command of the type (3) as mentioned above. The second is a view_transformation command which designates the view point and it here designates a visual field transformation matrix parameter. This is a command of the type (1). The third is a clip_area command which designates the range of display and it here designates a clip area. This is a command of the type (2)-2. The fourth is a modeling_transformation command to designate a modeling transformation and it here designates a matrix parameter for modeling transformation. This is a command of the type (1). The fifth is a line_color command to designate the color of a line segment and it designates the line color as "red" here as a parameter. This is a command of a type (2)-1. The sixth is a line_type command to designate the type of a line and it here designates a solid line. This is a command of the type (2)-1. The seventh is a line_width command to designate the thickness of a line segment, and the width of a line and it here designates the line width as having one dot. This is a command of the type (3). The eighth is a kind of a primitive command which is a line segment defining command which defines a line segment string or a poly_line command and it here designates the vertex coordinates of a line segment as a parameter. Namely, the line segment string is displayed in accordance with the attribute designated by the attribute command mentioned above. The ninth is a line_color command to designate the line color and it here designates the line color as "blue". This is the command of the type (2)-1. The tenth is a poly_line command to designate a line segment string. The eleventh is a line color command and it here designates "white". The twelfth is a poly_line command and it here displays the line segment string. The thirteenth is a surface_reflection command to designate the surface reflection index or the coefficient of light reflection and it here designates a value where the color of the surface becomes white. This is a command of the type (2)-1. The fourteenth is an interior_style command to designate how to fill a surface out and the interior style and it here designates "hatched" here. This is a command of the type (2)-2. The fifteenth is a polygon defining command or a polygon command which is a kind of a primitive command to define a polygon and it here designates the coordinates of the vertexes of a parameter polygon and a normal vector. The sixteenth is a line_color command and it here designates the line color "blue". The seventeenth is a line_type command and it here designates the line type "broken line". The eighteenth is a line_width command and it here designates the line width "2 dots". The nineteenth is a poly_line command.

Figure 3B:
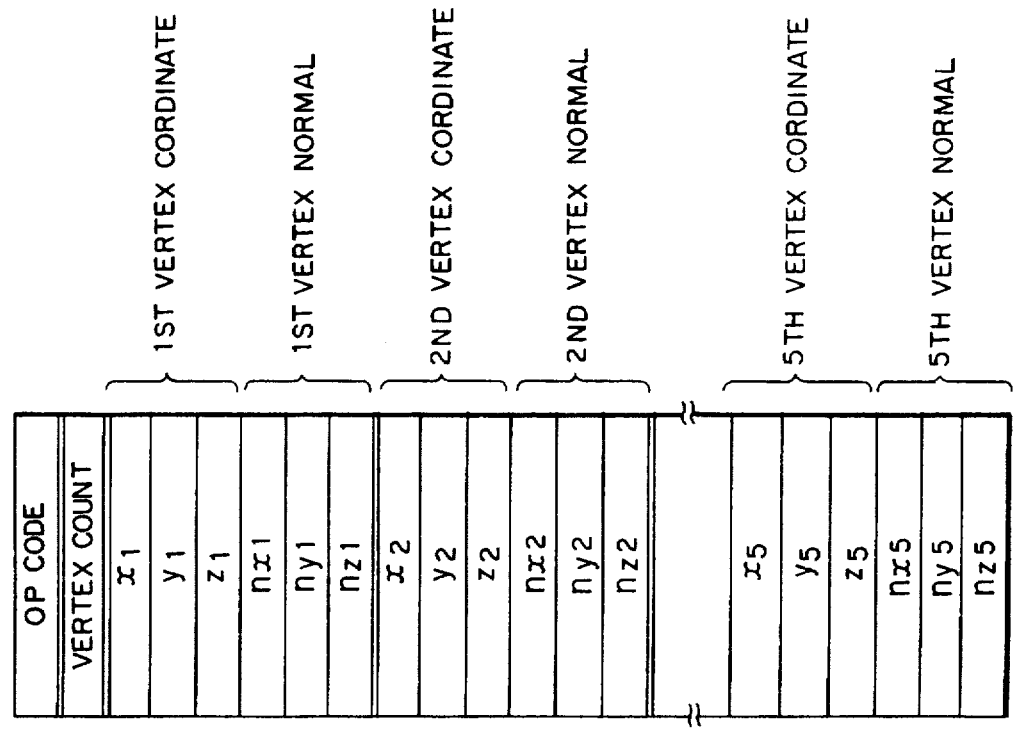
FIG. 3B schematically illustrates the form of a polygon definition command used in each of the embodiments.

The details of the graphic commands will be described with reference to FIGS. 3A–3C. FIG. 3A shows a poly_line command which is a kind of a primitive command which includes the respective coordinates of the vertexes in 3-dimensional space which defines an OP code, the vertex count of a line segment string and the line segment string. FIG. 3B shows a polygon command which is a kind of primitive command and contains data on the OP code, vertex counts, the coordinates of the vertexes in the coordinate system which defines the polygon and the normal vectors for calculation of the intensity. The attribute command includes an OP code to designate the kind of a command and the approximate attribute value as shown in FIG. 3C.

Figure 4:
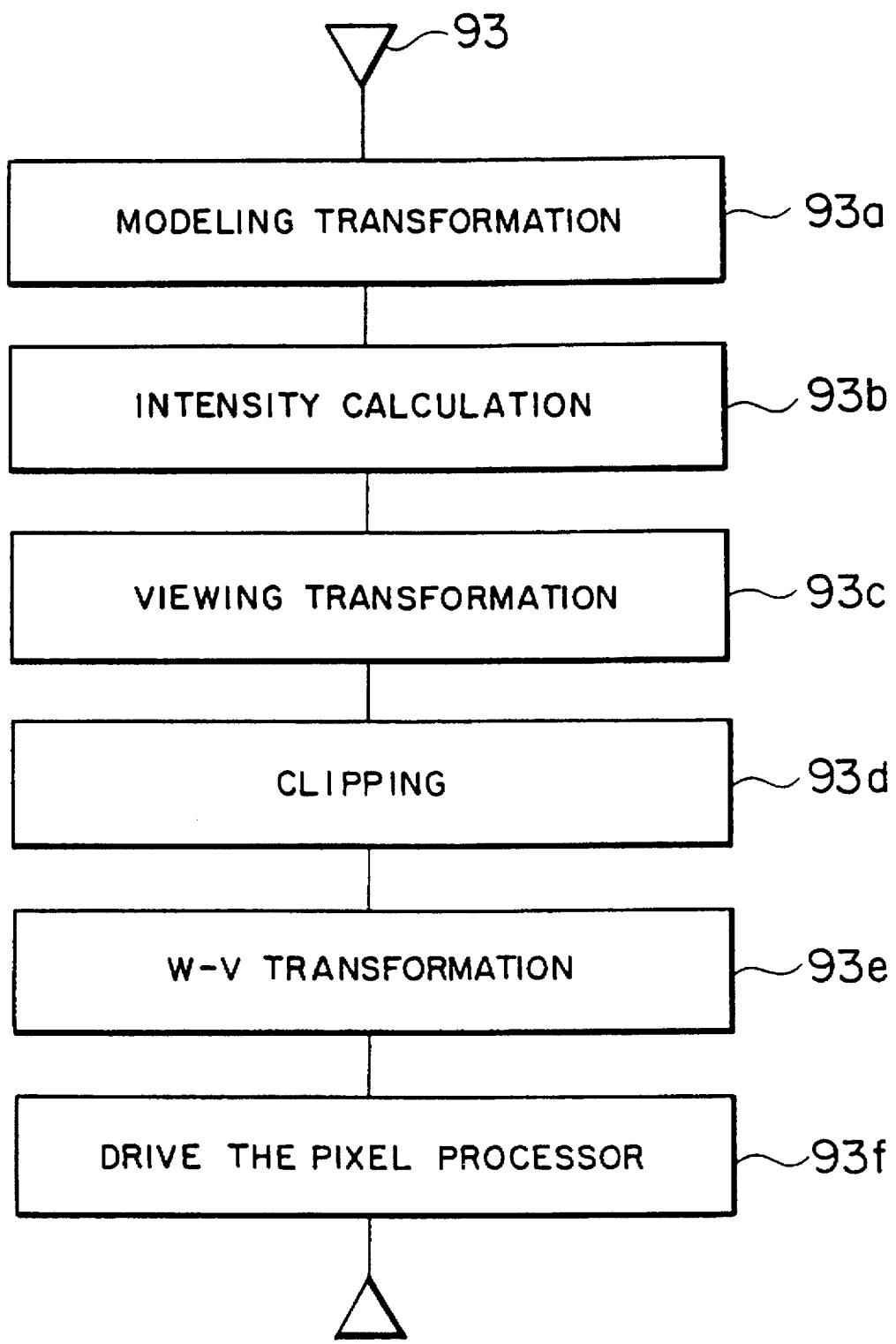
FIG. 4 is a flowchart indicative of the sequence of processing of a polygon definition command in each of the embodiments.

FIG. 4 is a flowchart 93 indicative of the processing of a polygon command as one example of a method of displaying a primitive command in the geometry processors 3a–3c. At step 93a, a polygon to be processed is subjected to coordinate transformation from a modeling coordinate system which defines the individual graphics to a world coordinate system in which the entire graphic is defined. At this time, a modeling transformation matrix designated by a modeling_transformation command is used. At step 93b, the intensity is calculated from data on the coordinates of the vertexes, normal voters at the vertexes, surface reflection index, and position and intensity of a light source. These pieces of data are directly obtained from a primitive command or attribute storage areas 31a–31c. At step 93c coordinate transformation is made for viewing transformation defined by the position and direction where a graphic is viewed. The transformation is made by a viewing transformation matrix designated by a view_transformation command. At step 93d that portion of a target polygon outside a clip area designated by a clip_area command is cut away. At step 93e a window view port (WV) transformation is made which includes a coordinate transformation of the display range to coordinates on a display screen of the actual monitor 6 such that the display range is mapped on the display region of the screen. At step 93f a pixel processor is driven in which the results of the above processing are formed as pixel processor commands which are sent to pixel processor 4 for generation and display of an image.

Figure 6A:
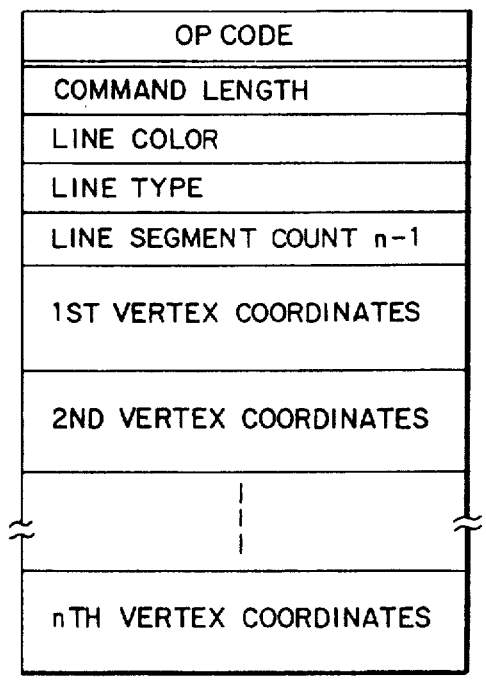
FIG. 6A schematically illustrates the form of a line segment display pixel processor command in each of the embodiments.
Figure 6B:
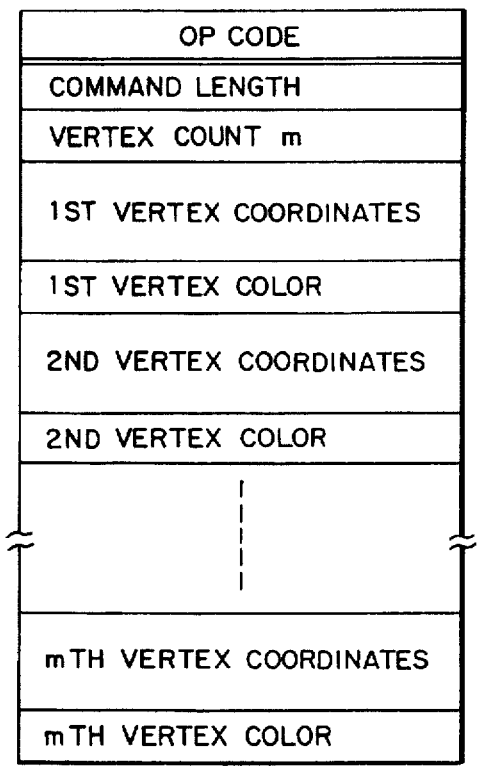
FIG. 6B schematically illustrates the form of a polygon display pixel processor command in each of the embodiments.
Figure 6C:
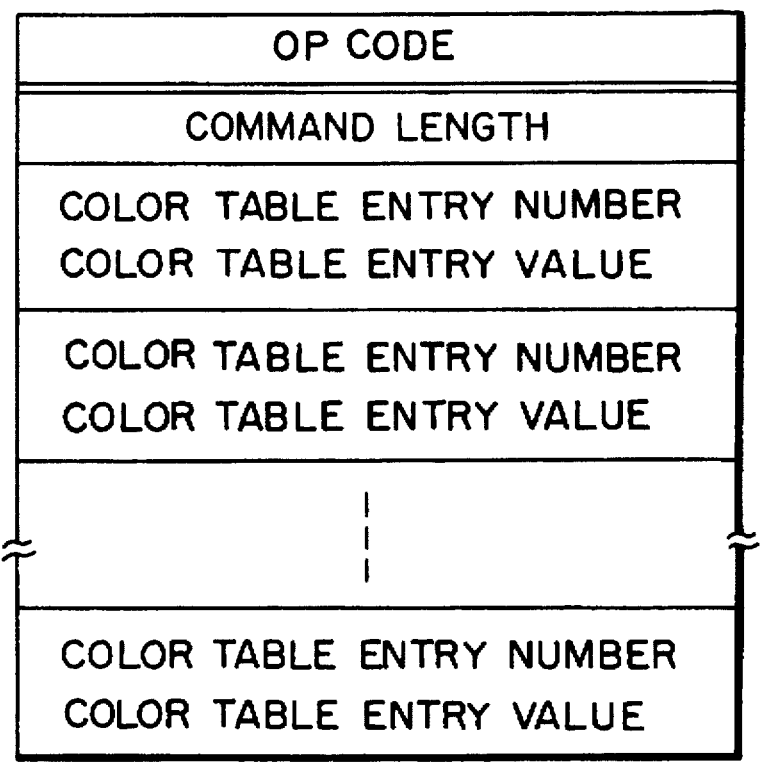
FIG. 6C schematically illustrates one example of the form of a color table setting pixel processor command in each of the embodiments.
Figure 6D:
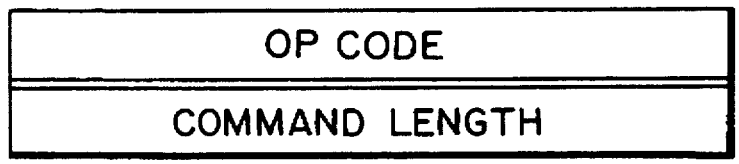
FIG. 6D schematically illustrates one example of the form of an invalid color table setting pixel processor command in each of the embodiments.

The form of a pixel processor command sent to pixel processor 4 will be described with reference to FIGS. 6A–6D. FIG. 6A shows a pixel processor command to display a line segment string or a p.poly_line command (in the present specification, the name of the pixel processor command is identified by "p." attached to the head of the name of the approximate graphic command) and includes an OP code indicative of the type of the command, the length of the command, a line color indicative of the color of a line, a line type, a line segment count and the coordinates of the respective vertexes. As mentioned above, since the line_color command and line_type command which are attribute commands to designate the line color and type are attribute commands of the type (2)-1, they are contained in the pixel processor command which defines a graphics and delivered to pixel processor 4. FIG. 6B shows a pixel processor command or p.polygon command which displays a polygon and designates the OP code, command length, vertex count, vertex coordinates and vertex intensities. FIG. 6C shows a color table setting command or p.color-table command as an example of the attribute commands and contains the OP code, command length, sets of entry number and value of a set color table with the number of sets of entry number and value being equal in number to the entries. Namely, the pixel processor command to designate the attribute includes an op code, command length and set values. FIG. 6D shows the type of an invalid command or p.no-operation command. This command does not especially indicate processing to pixel processor 4. When the graphic is completely outside the clip area and geometry processors 3a–3c are not required to especially provide outputs, that command is used to prevent disorder in the sequence of processing in pixel processor 4. If no outputs are provided, discrepancy will occur since a fetch target geometry processor selective signal 233 is already sent.

Figure 3C:
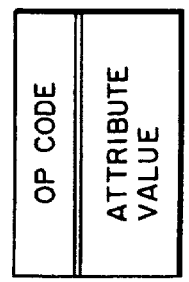
FIG. 3C schematically illustrates the form of an attribute command used in each of the embodiments.

FIG. 5 shows the state of transition of attribute data when the series of graphic commands of FIGS. 3A–3C are processed by the graphic display apparatus according to the present invention in order to describe a method of control over the attributes by the attribute commands. It shows the graphic command number indicative of the sequence of issue of the graphic command, the name of the issued graphic command, the set value of each attribute and the command type. The command type indicates a primitive command or an attribute command, or one of the above-mentioned types if the command is the attribute command.

It will be seen that the attribute value is set by the attribute command and that the primitive command is processed with that attribute value. The designated values of the color table, viewing transformation matrix, clip area and modeling transformation matrix are set for graphic command numbers 1–4.

Thereafter, attribute data is set up to the poly_line command of a graphic command number "8", as described below. Namely, the line color is set to "red" the line type to "solid line" and the line width to "1 dot". While the poly_line command of graphic command number "8" is processed by any one of geometry processors 3a–3c, the graphic attributes required by geometry processors 3a–3c are delivered to all the geometry processors 3a–3c and processed, as mentioned above, so that correct attribute data is set in the attribute storage area of each of the geometry processors 3a–3c. Thus, processing by referring to this data leads to display with correct attributes.

In the poly_line command of graphic command number "10", the line color is changed to "blue", the graphic command number "10" is not displayed in the present embodiment because the entire line segment string is outside the display range. In the poly_line command of graphic command number "12" the line color is further changed to "white". In the polygon of graphic command number "15" the viewing transformation and the surface reflection index are designated, the surface color is designated as "red" and the interior style is designated as "hatched". In the poly_line of graphic command number "19", the line color is changed to "blue" the line type to "broken line" and the line width to "2-dot".

It will be seen for the primitive command that, as described above, display is made with an attribute designated last before the primitive command. This principle must be obeyed also when a plurality of processors perform separate displaying operations.

FIG. 1B is a block diagram of a first embodiment of a graphic display apparatus according to the present invention. In the present embodiment, a primitive command and an attribute command which geometry processors 3a–3c are not required to process, or an attribute command of type (3), are sent to one of geometry processors 3a–3c which is regarded as having a relatively light load. The attribute command which the geometry processors are required to process are sent to all the geometry processors 3a–3c. For the commands output as pixel processor commands from geometry processors 3a–3c or a primitive command, attribute commands of type (2)-2 and 3 in the present embodiment, the data allocated to geometry processors 3a–3c is sent to pixel processor 4 as data on selection of a fetch target geometry processor. Thus, pixel processor 4 takes the pixel processor command on the basis of that data to make a display in correct sequence.

First, this operation will be outlined. That portion of the graphic command produced by main processor 1 and corresponding to graphic control processor 10 of FIG. 1A is sent by command distribute means 2 comprising special-purpose hardware to distribute a graphic command to geometry processors 3a–3c to be subjected to the above mentioned graphic processing. Command distribute means 2 sends to pixel processor 4 data on allocation of the graphic command to geometry processor 3a–3c as a fetch target geometry processor selection signal 233. In pixel processor 4, parameter input controller 42 takes the pixel processor command from any one of FIFOs 41a–41c corresponding to geometry processors 3a–3c on the basis of the selection signal 233 and sends it to image generator 43, which transforms the pixel processor command as geometry data to image data and writes the image data into frame memory 5. The image data prepared by frame memory 5 is converted to a color to be displayed actually by color table 51 and displayed on monitor 6.

The essential portion of the arrangement of FIG. 1B is command distribute means 2 and pixel processor 4. First, the structure and operation of command distribute means 2 will be described. The command distribute means 2 includes:

(1) FIFOs 24a, 24b and 24c provided for the corresponding geometry processors to buffer graphic commands;

(2) An attribute command distributor 20 which distributes attribute commands of type (1) and (2)-1 to FIFOs 24a, 24b and 24c;

(3) An attribute command distributor 21 which distributes an attribute command of type (2)-2 to all FIFOs 24a, 24b and 24c and sends data on the allocation to a geometry processor as a fetch target geometry processor selection signal 233;

(4) An OR gate 22 which performs an OR operation on "full" signals 241a, 241b and 241c indicating that the respective FIFOs 24a–24c are full and which sends an attribute command FIFO full signal 221 indicating that any one of the FIFOs is full;

(5) A primitive command distribute controller 23 which selects geometry processors 3a–3c which process the primitive command and an attribute command of type (23), sends to the appropriate FIFO the command from main processor 1 and delivers to main processor 1 a signal as to whether the appropriate FIFO is full or not;

(6) An attribute command port 25 through which attribute commands of type (1) and (2)-1 are received;

(7) An attribute command port 26 through which an attribute commands of (2)-2 are input; and (8) A primitive command port 27 through which a primitive command and an attribute command of type (3) are input.

Command distributor 2 receives/outputs a graphic command as well as the following signals:

(1) An attribute command start signal 211 which communicates the start of transmission of attribute command of type (2)-2 by main processor 1;

(2) An attribute command FIFO full signal 221 indicating whether any one of FIFOs 24a and 24c is full;

(3) A primitive command start signal 231;

(4) A primitive command FIFO full signal 232 indicating that the FIFO which primitive command distributing control unit 23 has selected is full; and (5) A fetch target geometry processor selection signal 233, mentioned above.

Figure 7A:
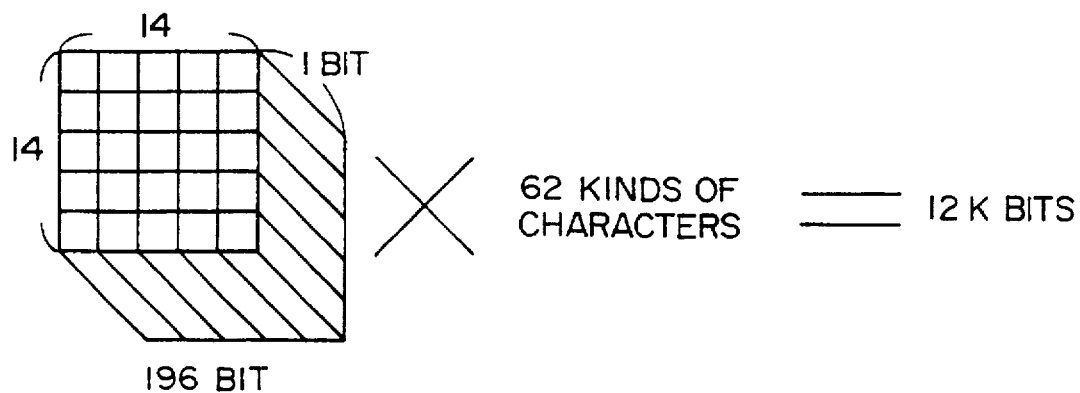
FIGS. 7A, 7B, 7C and 7D each are a flowchart indicative of a process of sending an attribute command in each of the embodiments.

The processing of main processor 1 and operation of the command distributor 2 of the present embodiment will be described for each type of a graphic command;

(1) For attribute commands of type (1) and (2)-1:

Main processor 1 performs the processing operation shown in the flowchart 11 of FIG. 7A. At step 11a these attribute commands are produced. At step 11b main processor 1 determines whether any one of FIFOs 24a–24c is not full by referring to an attribute command FIFO full signal 211. If full, it waits until one of the FIFOs becomes empty. At step 11c the main processor sends a one-word part of the command generated by attribute command port 25. At step 11d the main processor determines whether all the commands have been sent. If not, it returns to step 11b to repeat the appropriate processing.

By such processing, the attribute commands of type (1) and (2)-1 are sent through attribute command port 25 to attribute command distributor 20, which sets those commands in all the FIFOs 24a–24c. As a result, those commands are sent to all the geometry processors 3a–3c and processed. No fetch target geometry processor selection signal 233 is sent, which is appropriate because no pixel processor commands are generated by the command of this type.

Figure 7B:
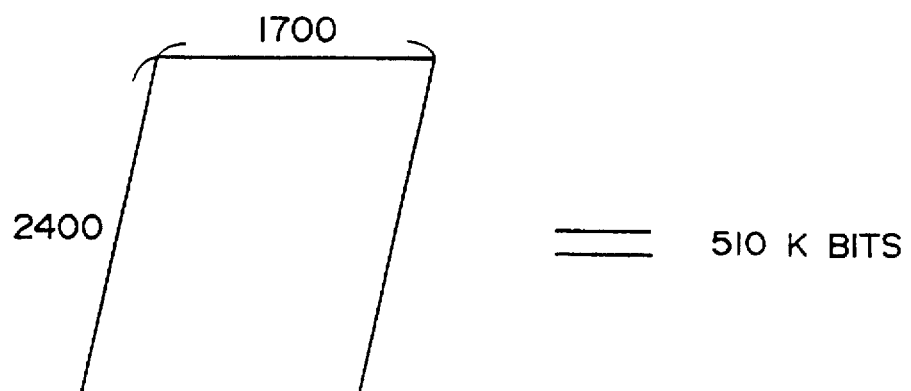

(2) For an attribute command of the type (2)-2:

Main processor 1 performs the processing shown in flowchart 12 of FIG. 7B. At step 12a, the main processor produces this attribute command. At step 12b, it sends an attribute command start signal 211. Thus, attribute command distributor 21 sends a fetch target geometry processor selection signal 233 indicating that the processing is allocated to all the geometry processors. This is because in the attribute commands of this type, each of geometry processors 3a–3c sends a pixel processor command in correspondence to one such command, so that the distributor 21 must send to the pixel processor a command to fetch the pixel processor command.

At step 12c, the main processor determines whether any one of all the FIFOs 24a–24c is empty by referring to attribute command FIFO full signal 221. If not, it waits. At step 12d it sends a one-word part of the produced command to distribute command port 26. At step 12e the main processor determines whether all these commands have been sent. If not, the main processor returns to step 12c to repeat the above processing.

Thus, the attribute commands of type (2)-2 enter through attribute command port 26 into attribute command distributor 21 and therefrom passes to all FIFOs 24a–24c. Fetch target geometry processor selection signal 233 is sent.

Figure 7C:
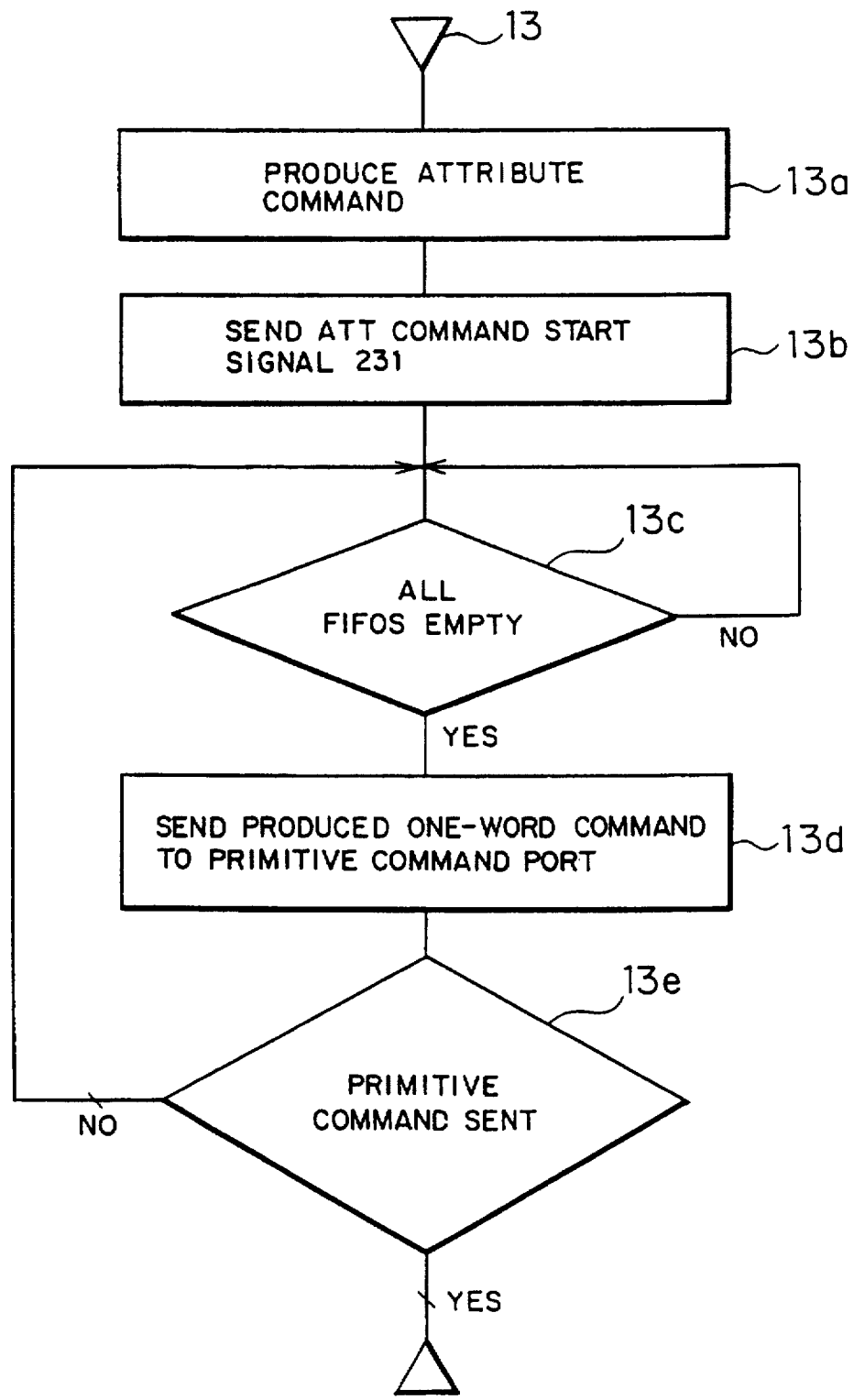

(3) For attribute commands of the type (3):

Main processor 1 performs the processing shown in flowchart 13 of FIG. 7C. At step 13a the main processor produces the attribute command. At step 13b it sends a primitive command start signal 231. Thus, the primitive command distribute controller 23 selects one of geometry processors 3a–3c which is regarded as having a relatively light load and sends a signal indicative of whether the appropriate FIFO is full or not, as a primitive command FIFO full signal 232. The controller 23 sends the selected geometry processor identification data as a fetch target geometry processor selection signal 233.

At step 13c the main processor refers to primitive command FIFO full signal 232 and determines whether the selected FIFO is empty. If not, the main processor waits. If the selected FIFO is empty, the main processor sends a one-word part of the command to primitive command port 27. At step 13e the main processor determines whether all the commands have been sent. If not, it returns to step 13c to repeat the above processing.

As just described above, the attribute command of type (3) is sent through primitive command port 27 to a FIFO corresponding to that of geometry processors 3a–3c which is regarded as having a relatively light load. The geometry processor identification data is sent as a fetch target geometry processor selection signal 233.

(4) For primitive commands:

The main processor performs the processing shown in the primitive command processing flowchart 15, which is the same as the processing of the attribute defining command of type (3) described in (3) except for generation of the primitive command at step 15a and further description of the subsequent steps will be omitted.

It will be seen that the attribute commands (of types (1) and (2)) to be processed by geometry processors 3a–3c are sent to and processed by all geometry processors 3a–3c and that the primitive commands and attribute commands which all geometry processors 3a–3c type (3) are not required to process are processed by any one of the geometry processors. It will also be seen that for the graphic commands (primitive command, attribute commands of types (2)-2, and (3)) output as the pixel processor commands that command distribute means 2 sends to pixel processor 4 the allocated geometry processor identification data as a fetch target geometry processor selection signal 233.

Figure 11:
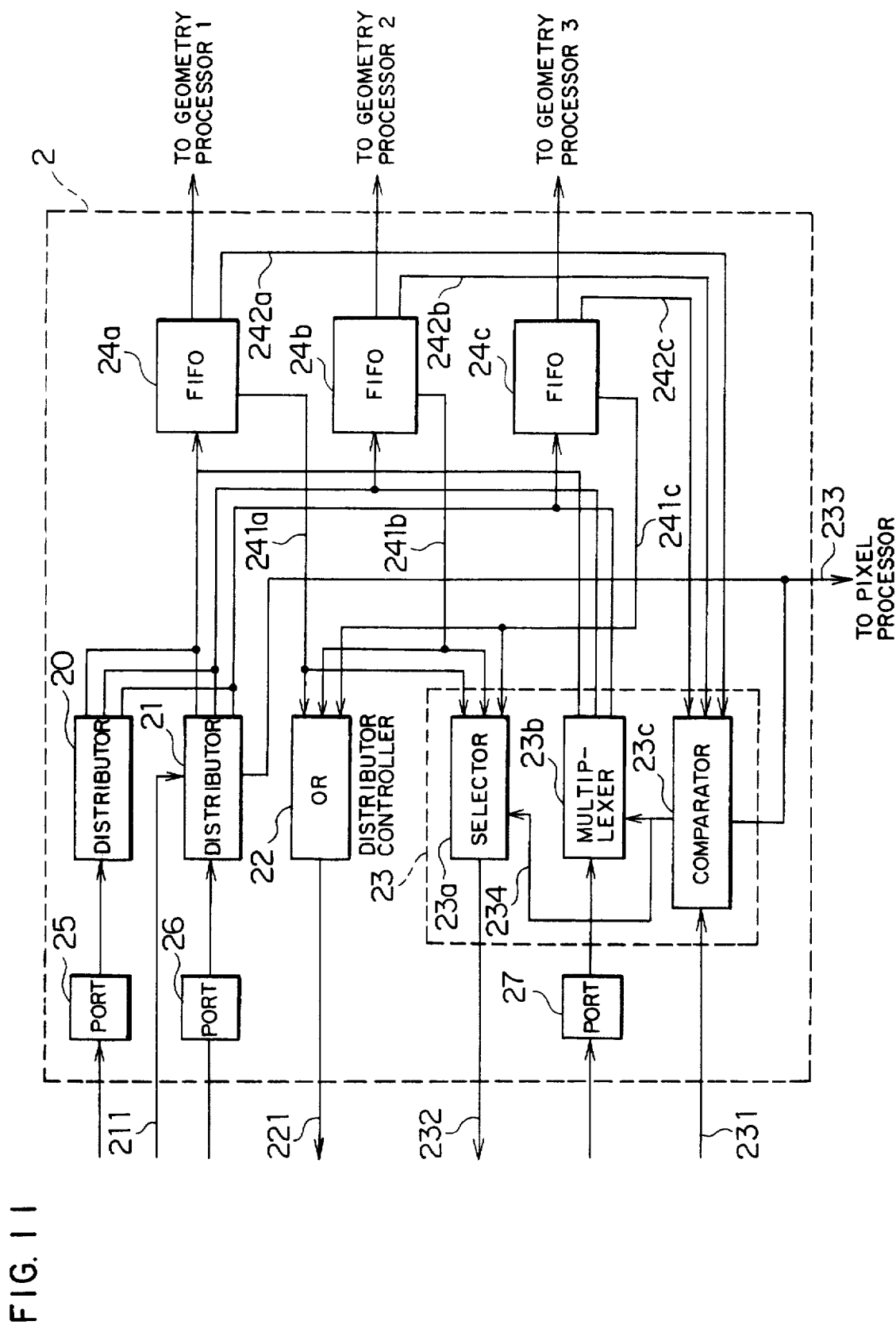
FIG. 11 is a block diagram of one illustrative command distribute means in the first embodiment of the graphic display apparatus according to the present invention.

The selection of a geometry processor which is regarded as having a relatively light load by primitive command distribute controller 23 in the present embodiment will be described. FIG. 11 is a detailed block diagram of a primitive command distribute controller 23 in command distribute means 2. Primitive command distribute controller 23 includes a selector 23a, a multiplexer 23b and a comparator 23c. When main processor 1 sends a primitive command start signal 231, comparator 23c compares empty word count signals 242a–242c each indicative of an empty word count and which of the FIFOs 24a–24c that has sent the largest empty count is selected. The comparator sends this result as a geometry processor selection signal 234 to selector 23a and multiplexer 23b. It also sends the result as a fetch target geometry processor selection signal 233 to pixel processor 4. Selector 23b selects a full signal of the selected geometry processor from full signals 241a-241c and outputs it as a primitive command FIFO full signal 232. Multiplexer 23b operates such that the command received from the primitive command port is set in the approximate FIFO using geometry processor selection signal 234.

It will be seen in this way that a graphic command is delivered to that of geometry processors 3a-3c which has the least remaining quantity of data in the corresponding one of FIFOs 24a-24c and that a signal 233 comprising the geometry processor identification data is also delivered to pixel processor 4.

Arranging of the sequence of processing the pixel processor commands in pixel processor 4 of FIG. 1B will be described below.

The pixel commands as the result of the processing by geometry processors 3a-3c are output to FIFOs 41a-41c. Parameter input controller 42 of pixel processor 4 FIFOs to fetch target geometry processor selection signal 233 and fetches a pixel processor command from any one of FIFOs 41a-41c so as to have a correct processing sequence, sends it to image processor 43, and displays it as image data.

Figure 12A:
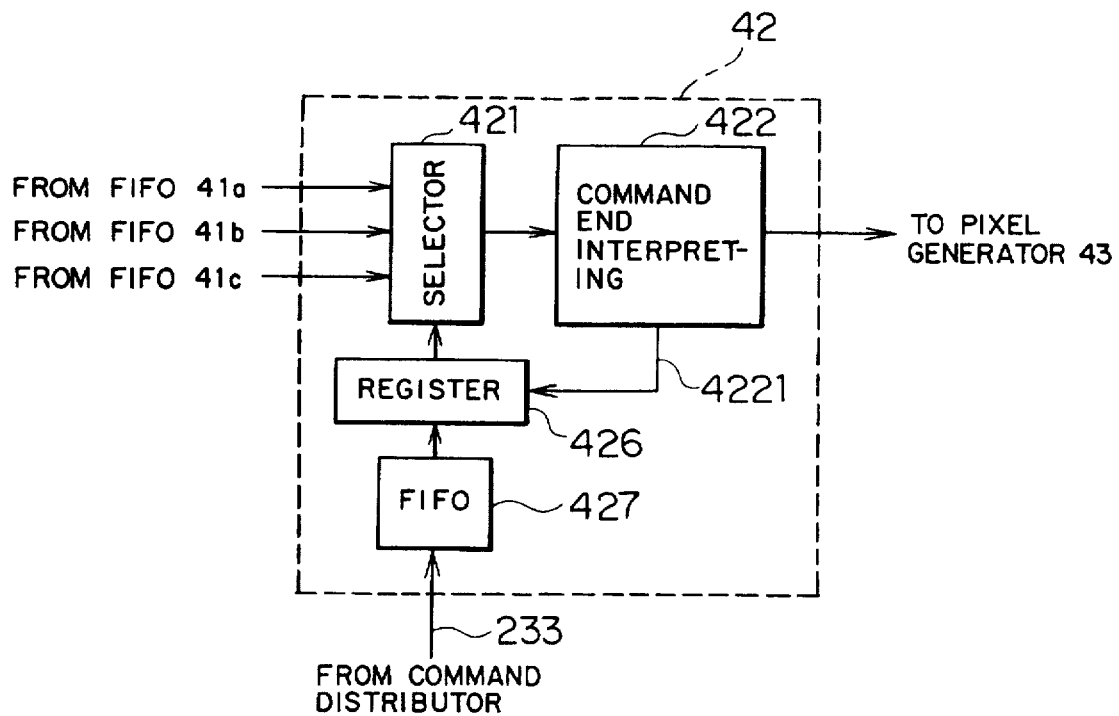

FIG. 12A is a block diagram of parameter input controller 42, which includes a selector 421, a command end interpreting unit 422, a geometry processor selection data register 426, and FIFO 427. FIFO 427 receives and stores fetch target geometry processor selection signal 233 in the order of arrivals. Geometry processor selection signals 233 or data on identification of one of geometry processors 3a-3c to fetch a pixel processor command is read by geometry processor selection data register 426, and this selection data is sent to selector 421. Selector 421 selects one of geometry processors 3a-3c and sends it to command end interpreting unit 422, which sends the received command to pixel generator 43 while determining the end of the input command using the data on the length of the pixel processor command. If the end of the pixel processor command is determined, the interpreting unit 422 stops fetching the pixel processor command from the geometry processor concerned at present, sends a fetch signal 4221 to geometry processor selection data register 426, and fetches the next selection signal 233 from FIFO 427. By this selection signal, one of geometry processor 3a-3c from which a pixel processor command is fetched is selected.

In this way, the pixel processor commands are processed in the natural correct sequence.

Display by the above method will be described by taking the series of graphic commands of FIG. 2 as an example. As shown by the hardware architecture of FIG. 1B, display will be described as parallel processing using the three geometry processors 3a-3c.

First, a specified output example of command distribute means 2 is shown. FIG. 9 shows the output of command distribute means 2 obtained when the series of graphic commands of FIG. 2 is processed. FIG. 9 shows which of the geometry processors each graphic command is output to, or the value of fetch target geometry processor selection signal 233 output when each command is processed and the value of a time mark used in the arranging of the processing sequence, the time mark being described later in more detail.

For simplicity, it is assumed that the processing time intervals of graphic commands allocated to and processed by only one of the geometry processor by those geometry processors are all the same. Thus, the load on the geometry processor to which the graphic command is allocated last is the lightest and the same command is allocated sequentially. The three geometry processors 3a-3c are referred to as geometry processors 1, 2 and 3 and their identification data are referred to as "1", "2", and "3" respectively The first color_table command is an attribute command of type (3), so that it is sent to geometry processor 1 alone, "1" or the value indicating geometry processor 1 is output as fetch target geometry processor selection signal 233. Since second view_transformation command is an attribute command of type (1), it is sent to all the geometry processors, but no fetch target geometry processor selection signal 233 is sent. Since the third clip_area command is an attribute command of type (2)-2, it is sent to all geometry processors 3a-3c and "1, 2, 3" are sent as fetch target geometry processor selection signal 233. The fourth modeling_transformation command is an attribute command of type (1) and an output similar to the second view_transformation command. The fifth line_color command is an attribute command of type (2)-1, so that it is sent to all geometry processors 3a-3c, but no fetch target geometry processor selection data is sent. The sixth line_type command is an attribute command of type (2)-1, so that it is handled like the fifth line_color command. Since the seventh line_width command is an attribute command of type (3), it is sent to geometry processor 2 and "2" is sent as fetch target geometry processor selection signal 233. Since the eighth poly_line command is a primitive command, it is sent to geometry processor 3 and "3" is sent as fetch target geometry processor selection signal 233. Subsequently, the appropriate commands are output from command distribute means 2, as shown in FIG. 9.

Figure 10A:
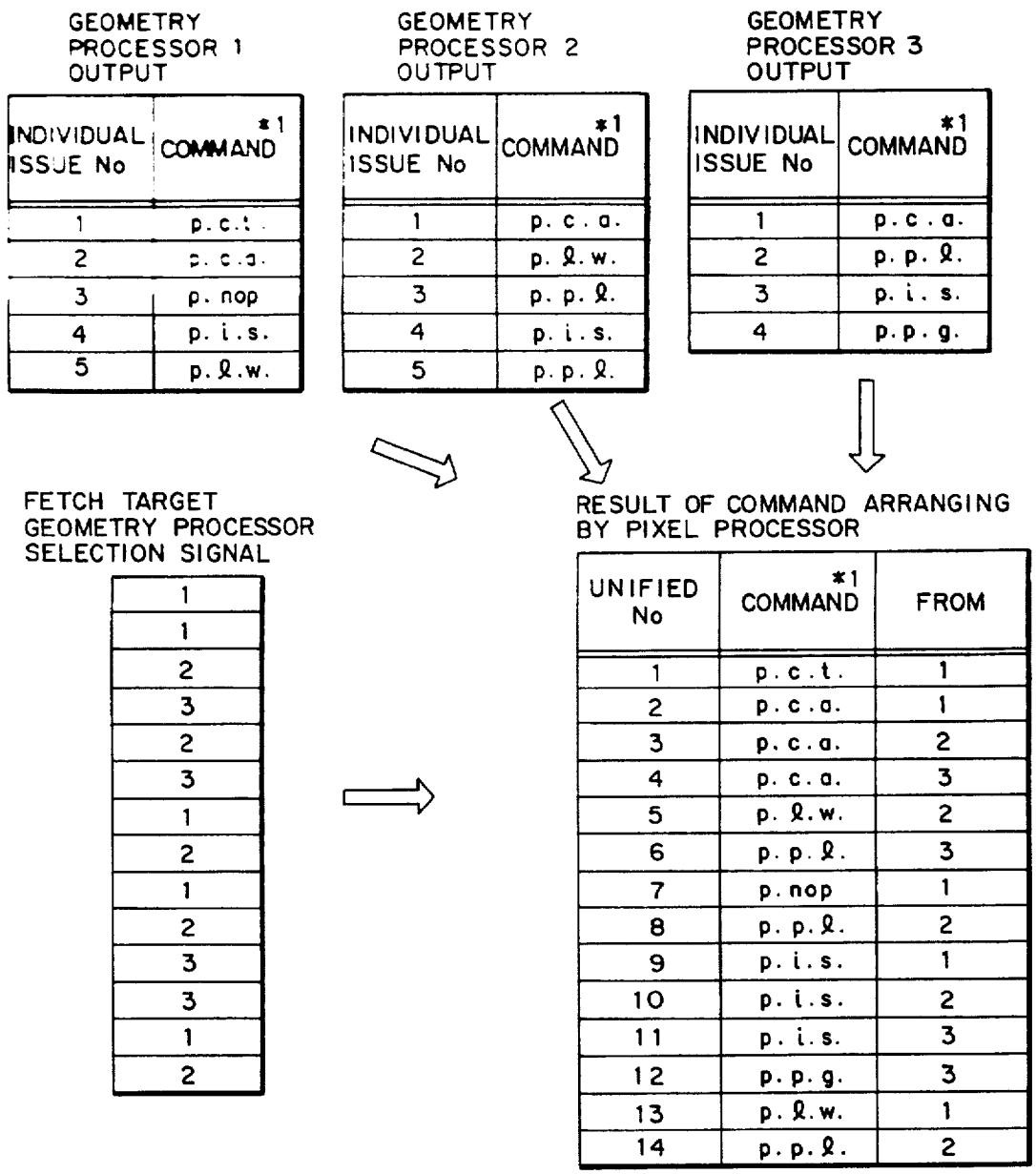

FIG. 10 illustratively shows the arranging of pixel processor commands when the graphic command was distributed and fetch target geometry processor selection signal 233 are sent. In FIG. 10, a series of pixel processor commands output from the respective geometry processors 1–3, a fetch target geometry processor selection signal and a series of pixel processor commands after being arranged. Geometry processor 1 outputs a p.color_table command, a p.clip_area command, a p.no operation command, a p.interior_style command and a p.line_width command. Geometry processor 2 outputs a p.clip_area command, a p.line_width command, a p.poly_line command, a p.interior_style command and a p.poly_line command. Geometry processor 3 outputs a p.clip_area command, a p.poly_line command, a p.interior_style command an a p.polygon command.

As shown in FIG. 9, the contents of the fetch target geometry processor selection signal are "1, 1, 2, 3, 2, 3, 1, 2, 1, 2, 3, 3, 1, 2". Thus, if the outputs of the geometry processors are arranged, the following result:

(1) p.color_table command, (2) p.clip_area command, (3) p.clip_area command, (4) p.clip_area command, (5) p.line_width command, (6) p.poly_line command, (8) p.no operation command, (9) p.poly_line command, (10) p.interior_style command, (11) p.interior_style command, (12) p.interior_style command, (13) p.polygon command, and (14) p.poly_line command. This is the same in sequence as the output pixel processor commands of the graphic commands shown in FIG. 9.

As described above, it will be seen that the pixel processor commands are arranged. Thus, the description of the FIG. 1 embodiment of the inventive graphic display apparatus ends.

A second embodiment of the present invention will be described in which attribute commands which geometry processors 3a–3c are not required to process, or attribute commands of type (3), are directly sent to pixel processor 4. If geometry processors 3a–3c are sorely shunted and the commands are directly sent to the pixel processor, the sequence of processing would be disordered.

In order to prevent this, an attribute command of type (3) is sent together with fetch target geometry processor selection signal 233 to pixel processor 4, which checks whether the received signal is the natural fetch target geometry processor selection signal or the attribute command of type (3). If it is the natural selection signal, the pixel processor uses this signal to select the appropriate one of the geometry processor 3a–3c to fetch the pixel processor command as in the first embodiment. If the received signal is an attribute command, the pixel processor fetches this command as the pixel processor command for processing purposes.

FIG. 1C is an overall block diagram of the second embodiment of the graphic display apparatus according to the present invention which is the same as the first embodiment except for command distribute means 2 and parameter input controller 42 of pixel processor 4. Command distribute means 2 newly includes an input port for an attribute command of type (3) or attribute command port 281 and an attribute command distributor 28 which sends that command as a fetch geometry processor selection signal 233.

Figure 7D:
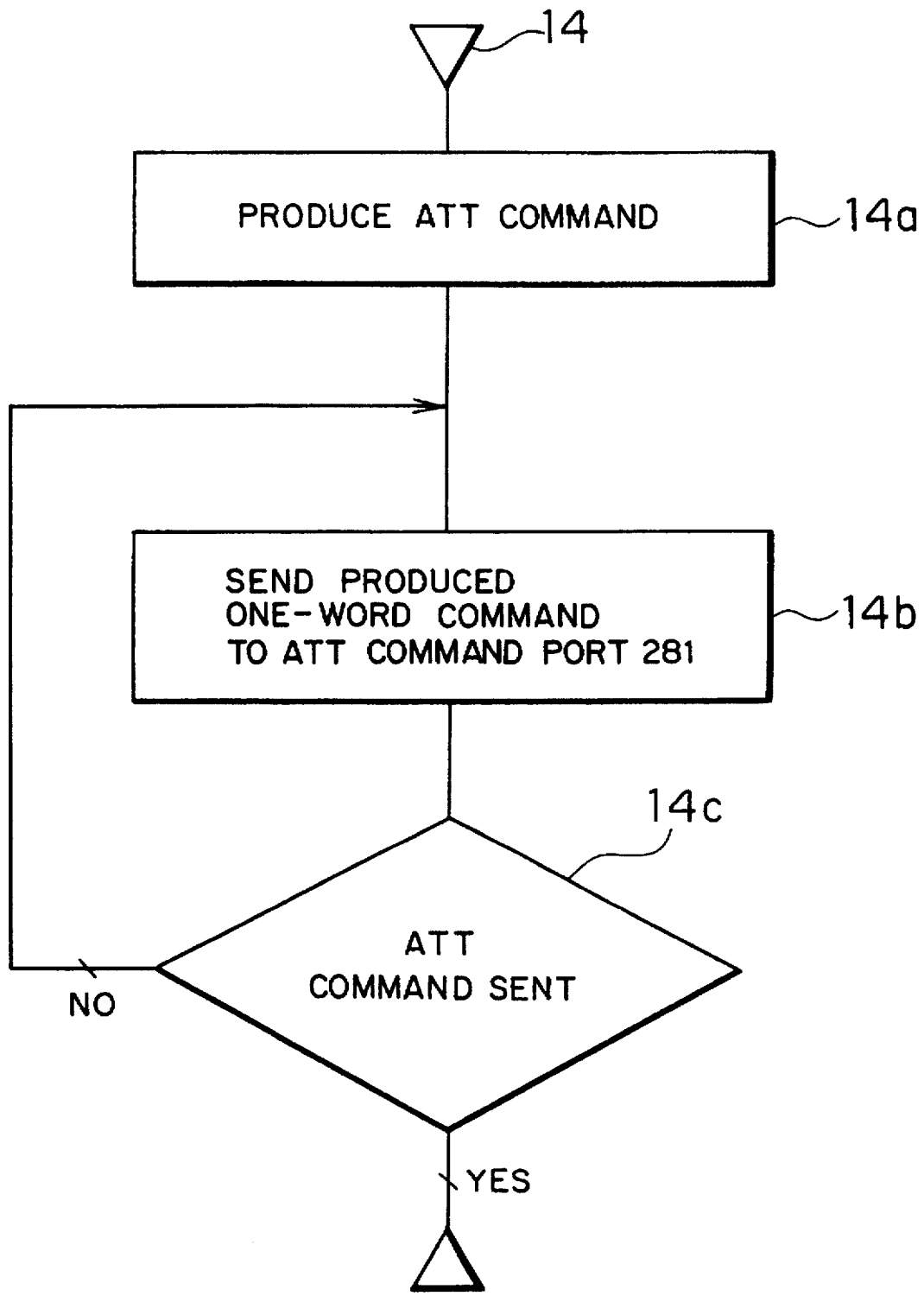
Figure 8:
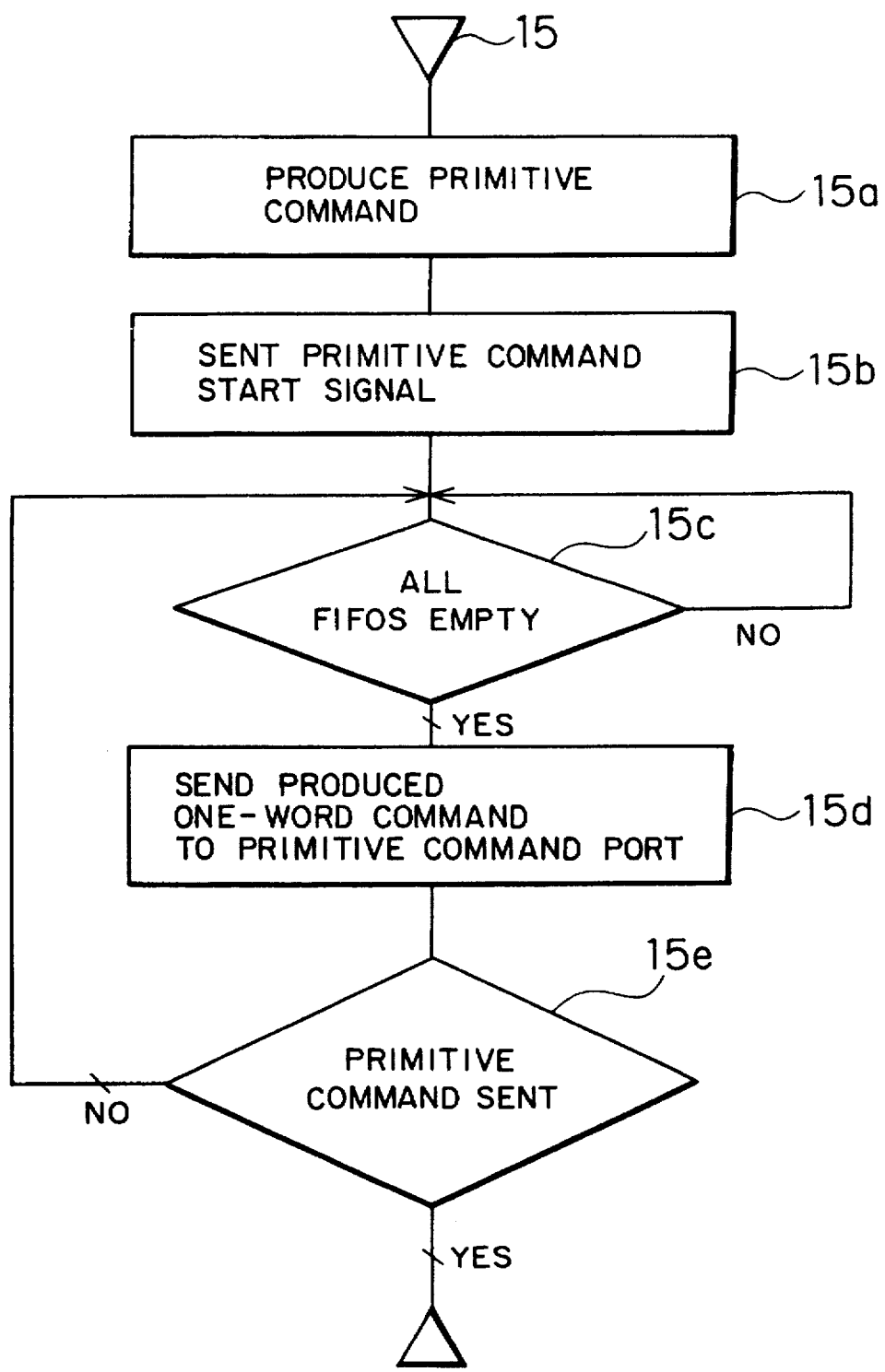
FIG. 8 is a flowchart indicative of a process of sending a primitive command in each of the embodiments.

Main processor 1 performs the processing shown in the flowchart 14 of FIG. 7D for the attribute command of type (3). Namely, at step 14a this attribute command is produced. At step 14b main processor 1 sends a one-word part of the produced command to attribute command port 281. At step 14c the main processor determines whether all the commands have been sent. If not, the main processor returns to the processing at step 14b and repeats the processing mentioned above.

By such processing, the attribute command of type (3) itself is sent to pixel processor 4 as fetched geometry processor selection signal 233.

Figure 12B:
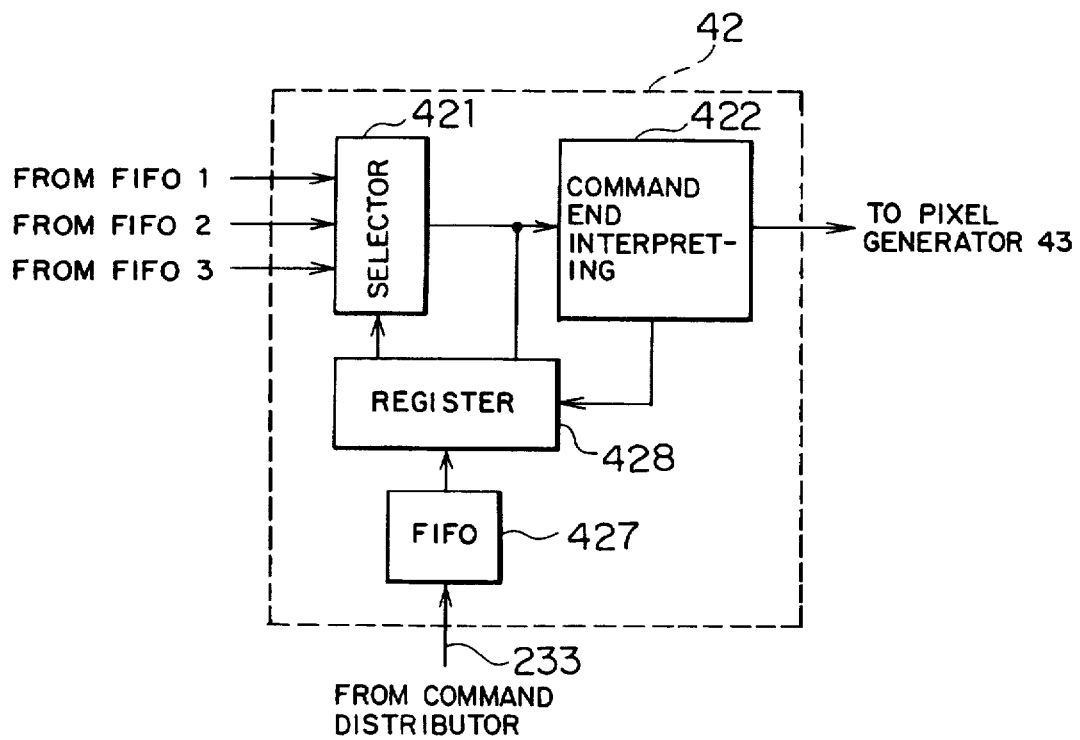

In pixel processor 4, parameter input controller 42 of FIG. 12B separates the natural signal and the attribute command of type (3) from fetch target geometry processor selection signal 233 and uses them according to purpose. Parameter input controller 42 includes a selector 421 which selects a pixel processor command from geometry processors 3a–3c, a command end interpreting unit 422 which determines the end of the pixel processor command, an FIFO 427 which sequentially stores fetch target geometry processor selection signals 233 and a geometry processor select controller 428 which determines whether the signal from FIFO 427 is the natural selection signal or an attribute command, outputs a signal indicative of one of fetch target geometry processors 3a–3c to selector 421 if it is the natural selection signal and sends an attribute command of type (3) to command end interpreting unit 422 if the signal from FIFO 427 is the attribute command of type (3). Command end interpreting unit 422 sends data on a pixel processor command to pixel generator 43 while determining whether the pixel processor command has ended. If so, command end interpreting unit 422 instructs geometry processor select controller 428 to fetch the next fetch target geometry processor selection signal 233 from FIFO 427 and to process the signal.

It will be seen from the above description that also in the second embodiment there is no disorder in the attributes and in the order of display and that display is made at high speed by parallel processing.

Description will be made of a system of arranging displays by managing the time or order of arrival of commands from main processor 1 as a third embodiment of the present invention.

Command distribute means 2 adds to each graphic command the time or order, as a time mark, of arrival of a command from main processor 1 and sends the result to the corresponding one of geometry processors 3a–3c. When geometry processors 3a–3c process the graphic command and sends the result to pixel processor 4, the geometry processors also add those time marks to the pixel processor commands, and sends the result. Pixel processor 4 refers to the time marks attached to the pixel processor commands and arranges the order of processing of the commands.

The overall block diagram of the third embodiment is shown in FIG. 1D. The third embodiment is the same as the first embodiment except for command distribute means 2 and parameter input controller 42. The attributes of types (1), (2)-1 and (2)-2 are sent to the same input port or attribute command port 291.

Before sending those attribute commands, main processor 1 sends attributes command start signal 293 with which attribute command distributor 29 takes a time mark from time mark generator 292. Simultaneously, time mark generator 292 updates the time mark. Thereafter, when the attribute command is sent to port 291, attribute command distributor 29 attaches a time mark to the head of the input graphic command, and sends the result to all FIFOs 24a–24c. This means that the command is processed by all geometry processors 3a–3c.

For a primitive command and an attribute command of type (3), main processor 1 sends a primitive command start signal 231 before sending the primitive command and attribute command of type (3). By signal 231, primitive command distribute controller 23 selects one of geometry processors 3a–3c which is regarded as having the least load and sends a primitive command FIFO full signal 232 indicative of whether there is an empty FIFO as in the first embodiment. In addition, distribute controller 23 takes a time mark from time mark generator 292, which simultaneously updates the time mark therein. Thereafter, when a graphic command is sent to primitive command port 27, controller 23 attaches the time mark, which has already taken, to the head of the graphic command and sends the result to the selected FIFO. In this way, the command and time mark are delivered to the selected geometry processor.

Arranging of pixel processor command processing by pixel processor 4 will be described below. When geometry processor processes a graphic command, a time mark (integer value) is attached to the head of the pixel processor command and the result is sent to pixel processor 4, as shown in FIG. 13. Parameter input unit 42 of pixel processor 4 takes time marks attached to the heads of the pixel processor commands output from the respective geometry processors 3a–3c and stored in FIFOs 41a–41c, and takes a pixel processor command which has the youngest or smallest value of those three time marks.

FIG. 12C is a block diagram of parameter input controller 42 which executes this process. Time mark registers 424a–424c hold the time marks of the outputs from the respective geometry processors FIFOs 41a–41c. Comparator 425 outputs signals 431a–431c to instruct time mark registers 424a–424c to take time marks from FIFOs 41a–41c in accordance with the instruction from command end interpreting unit 422 or a time mark comparison signal 429. If the time marks are taken, comparator 425 compares the time marks in time mark registers 424a–424c, selects that of FIFOs 41a–41c which has the smallest time mark, and sends it to selector 421 as geometry processor selection signal 430. By this signal, selector 421 selects one of geometry processors 3a–3c from which the pixel processor command is fetched. Command end interpreting unit 422 sends data on the pixel processor command to image generator 43 while monitoring whether one pixel processor command has ended. If the transfer has ended, it stops fetching the command data from the FIFO and sends time mark comparison command signal 429 to comparator 425, which then instructs the time mark register of the geometry processor which has fetched the pixel processor command so far to take the time mark. When taking the time mark has ended, comparator 25 selects the smallest geometry processor in the time mark registers, as mentioned above, to thereby determine the geometry processor from which the time mark is next taken and sends geometry processor selection signal 430 to selector 421.

In this way, in the present embodiment, pixel processor commands are processed in the order of increasing time marks.

FIG. 9 shows the output of command distribute means 2 when the series of graphic commands shown in FIG. 2 is displayed. Allocation of graphic commands to the respective geometry processors 3a–3c is the same as in the first embodiment, and the time marks of FIG. 9 or the values "1" to "19" are added to the graphic commands in the order of their issue and sent to geometry processors 3a–3c. FIG. 10B shows the output pixel processor commands obtained from the geometry processors as a result of their processing. In the following description, geometry processors 3a–3c are expressed as geometry processors 1, 2 and 3, respectively, as in the previous embodiment.

Geometry processor 1 outputs p.color_table command (1), p.clip_area command (3), p.no operation command (10), p.interior_style (14) and p.line_width command (18). Geometry processor 2 outputs p.clip_area command (3), p.line_width command (7), p.poly_line command (12), p.interior_style command (14), and p.poly_line command (19). Geometry processor 3 outputs p.clip_area command (3), p.poly_line command (8), p.interior_style command (14) and p.polygon (15) command. The bracketed values show the time mark values.

Pixel processor 4 processes those pixel processor commands in order of increasing time mark values as shown in FIG. 10B. As just described above, some of graphic commands are not output as pixel processor commands. Some time marks are not output, but display is made in correct order with the time mark values. Since all the attribute commands which are required by the processing of geometry processors 3a–3c are processed by those geometry processors 3a–3c, no disorder is produced in the attributes. The above control is achieved only by sending to command distributor 2 the graphic commands in a program conforming to type.

FIG. 14 shows a fourth embodiment of the present invention realized as a close coupling type multiprocessor structure. This system connects main processor 1, graphic control processor 10, main memory 101, geometry processors 30a, 30b and 30c and pixel processor 4 through a system bus 100. Geometry processors 30a–30c are constructed as caches 301a, 301b, 301c and micro-processors 302a, 302b and 302c, respectively.

Main memory 101 includes programs for the respective geometry processors 30a–30c or program 102 for graphic processing as described in the above embodiments, a graphic command area 103 which stores graphic commands, FIFO areas 240a–240c for the corresponding geometry processors and attribute storage areas 310a–310c which store the attributes. FIFO areas 240a–240c are realized by software.

Main processor 1 produces graphic commands and stores them in graphic command area 103. Graphic control processor 10 sets the graphic command in graphic command area 103 on FIFO areas 240a–240c which is a medium area to geometry processors 30a–30c in accordance with the rules mentioned above such that the graphic commands to be sent to all geometry processor 30a–30c are set on FIFO areas 240a–240c, and that the commands which have a relatively light load on the appropriate geometry processor FIFO area. Simultaneously, graphic control processor 10 sends to pixel processor 4 a fetch target geometry processor selection signal 233 which takes in through system bus 100.

Geometry processors 30a–30c fetch graphic commands from their FIFO areas 240a–240c, processes the graphics using their attribute memory areas and send the results to pixel processor 4, which produces an image on frame memory 5 and displays it on monitor 6 as in the first embodiment.

In this way, the close-coupling type multiprocessor processes graphic commands in parallel using a plurality of processors and prevents disorder in the attributes and sequence of display, as in the first embodiment.

In the tightly coupled multi-processor of the present embodiment, main processor 1, graphic control processor 10 which has a command distributing function, and geometry processors 30a–30c are not required to be considered as being physically fixed. Alternatively, a processor or task which is the main portion of the processing, or three processes, i.e., the main processor process which executes the processing which the main processor 1 described so far is to execute, the control process which executes the process which graphic control processor 10 has executed, and the geometry processor process which executes the graphic processing which geometry processors 30a–30c execute may be allocated to the plurality of processors which constitute the tightly coupled multi-processor for operating purposes.

Concerning the processes or tasks, see books on an operating system, for example, Takahashi et al; "Function and Structure of an Operating System", chap. 5 (Concept and Control of a Process), published by Iwanami Shoten, 1983.

In the fourth embodiment, command distribute means 2 of the hardware structure of the first embodiment may be connected to system bus 100 to fetch a graphic command from FIFOs 24a–24c of command distribute means 2. In this case, main processor 1 sends a graphic command to the appropriate port of command distribute means 2 in accordance with the type of the graphic command, as in the first embodiment.

While in the above description it is assumed that graphics are displayed in the order of reception of the appropriate primitive commands from main processor 1, there is a case where the order of display does not necessarily become a problem. In this case, it is unnecessary to arrange the pixel processor commands in pixel processor 4, and command distribute means 2 is required to perform only a distributing operation and not required to perform an arranging operation.

Figure 15:
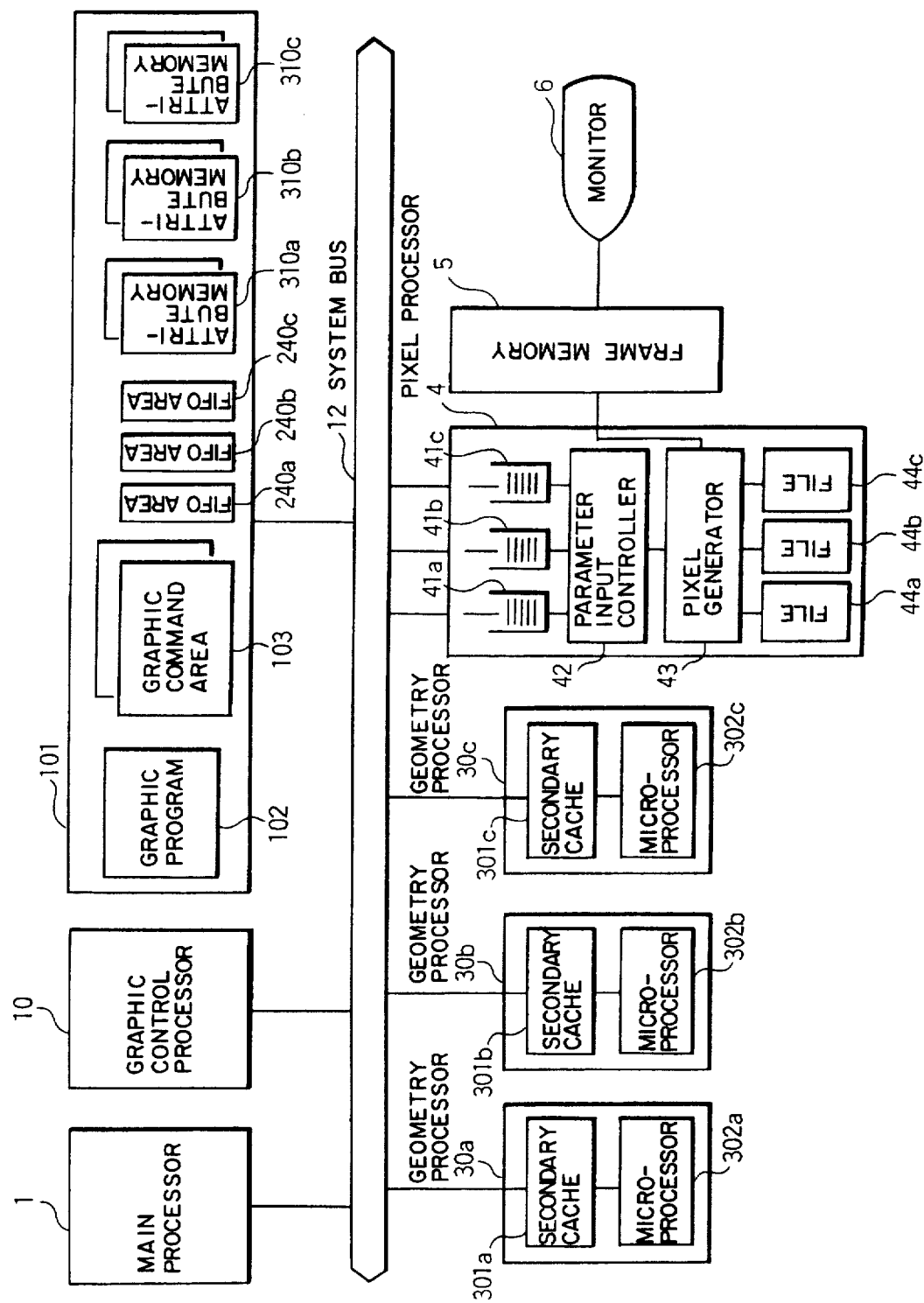
FIG. 15 is a system block diagram of a fifth embodiment of the graphic display apparatus according to the present invention.

FIG. 15 shows the entire block diagram of a fifth embodiment of the graphic display apparatus according to the present invention and employing that method, as just mentioned above. The fifth embodiment is the same in structure as the FIG. 14 embodiment except that no fetch target geometry processor selection signal 233 to pixel processor 4 is not used and hence is not input to parameter input controller 42 because arranging pixel processor command is not required in the present embodiment and that the geometry processors include the corresponding attribute register files 44a–44c of pixel processor 4 which store attribute data such as, for example, line width, line type, line color and interior style designated by attribute commands of the type (2)-1, (2)-2 and (3) and received as pixel processor commands in order to hold the states of attributes for the corresponding geometry processors 30a–30c and to prevent disorder in the attributes also in pixel processor 4 as in the attribute memory areas 310a, 301b and 310c in geometry processors 30a–30c to hold the attribute values.

In the present embodiment, graphic control processor 10 of command distribute means 2 sends all the types of graphic commands to all geometry processors 3a–3c, and primitive commands to geometry processors which are regarded as having a relatively light load for processing purposes. Geometry processors 3a–3c process attribute commands and graphics as mentioned above. The results of this processing are sent as pixel processor commands to pixel processor 4.

Pixel processor 4 is not required to perform the arranging operation and is only required to fetch the pixel processor commands through FIFOs 41a–41c from geometry processors 30a–30c. At this time, the pixel processor commands are required to be fetched equally so as not to cause hindrance, for example, due to fetching only through a particular one of FIFOs 41a–41c. At this time, use of attribute register files 44a–44c corresponding to geometry processors 3a–3c from which the commands have been fetched is required.

Also in the fifth embodiment, command distribute means 2 such as that described in the first embodiment may be used in place of graphic control processor 10. Of course, the attribute commands are required to be sent uniformly to all the geometry processors. No fetch target geometry processor selection signal 233 is required to be generated.

According to the present invention, as mentioned above in detail, by sending graphic commands according to type in predetermined procedures to graphic processing means which includes a plurality of processors, high speed display is achieved using parallel processing without causing a disorder in the attributes and order of display even if no special processing is performed. This is achieved by using relatively simple hardware such as a command distribute means and image generating means which have relatively simple structures.

We claim:

1. A graphic display apparatus for display of a graphic on the basis of a series of graphic commands including attribute commands which designate states of the graphic attributes and primitive commands which define graphics to be displayed, comprising:

means for generating the series of graphic commands including discrimination data for allocating to a fetch target;

means including a plurality of processing means for processing a graphic in parallel on a basis of the series of graphic commands and outputting geometry data, the respective processing means dividing the primitive commands of the series of graphic commands in units of a command and outputting the geometry data;

command distributing means having a plurality of input ports for receiving the attribute commands and the primitive commands from the generating means on the basis of the discrimination data, and distributing primitive commands to any one processing means which has the lightest load of the graphic processing and outputting to all the processing means at least those of the attribute commands which the processing means uses; and image generating means for arranging the geometry data comprising the output of said graphic processing means along the sequence of the corresponding series of graphic commands and for generating the image data on the basis of discrimination data.

2. The graphic display apparatus according to claim 1, wherein:

the command distributing means has a plurality of input ports for receiving the attribute commands and the primitive commands frown the generating means on the basis of discrimination data, and for distributing the primitive commands to any one processing means which has the lightest load of graphic processing, and outputting to all the processing means at least those of the attribute commands which processing means uses; and a plurality of FIFO (First In First Out) units connected to the processor and provided for the corresponding processing means of the plurality for temporarily storing the appropriate commands.

3. The graphic display apparatus according to claim 2, wherein:

said command generating means automatically discriminates said graphic commands sent to one of said processing means from said graphic commands sent to all of said processing means, both commands being sent to another input port of said command distributing means.

4. A graphic display apparatus for displaying a graphic on the basis of a series of graphic commands including a primitive command defining a graphic to be displayed, an attribute command to designate the state of the attributes of the display of the graphics, comprising:

means for generating the series of graphic commands including discrimination data for allocating to a fetch target;

graphic processing means comprising a plurality of processing means for processing graphics in parallel on the basis of the series of graphic commands and generating geometry data corresponding to the primitive command, the respective processing means processing the primitive command of the graphic commands on a shearing basis in units of a command on the basis of the state of the attributes when the primitive command issues and outputting the geometry data;

command distributing means having a plurality of input ports for receiving the graphic commands from the command generating means and for distributing at least the primitive command to one of the plurality of processing means which has the lightest load, and for delivering at least those of the attribute commands which the processing means process to all the processing means, and for sending data on allocation to the plurality of processing means to the image generating means when the command distribute means distributes the series of graphic commands; and means for generating image data from the geometry data comprising the output of the graphic processing means on the basis of the data on the allocation.

5. The graphic display apparatus according to claim 4, wherein:

the image generating means comprises a plurality of FIFOs one corresponding to each of the processing means of the plurality and pixel generating means for sequentially generating the image data from the geometry data in the FIFOs on the basis of data on the allocation.

6. The graphic display apparatus according to claim 4, wherein:

the command distribute means includes distribute means for receiving the series of graphic commands from the command generating means, distributing the primitive command and that of the attribute commands which the processing means is not required to process to one of the processing means which has the lightest load of graphic processing, and outputting at least those of the attribute commands which the processing means use to all the processing means, and a plurality of FIFO (First In First Out) units connected to the distribute means and provided for the corresponding processing means of the plurality for temporarily storing the appropriate commands.

7. The graphic display apparatus according to claim 6, wherein:

the command distribute means selects the processing means which has the lightest load of graphic processing on the basis of the respective quantities of data in the FIFOs of the plurality.

8. The graphic display apparatus according to claim 4, wherein:

the command distributing means includes means for attaching marks to the corresponding commands constituting the series of graphic commands in the sequence of reception of the commands when the command distributing means distributes the series of graphic commands from the command generating means, the marks being transferred to the geometry data, and the image generating means generates image data on the basis of the marks.

9. A graphic display method of obtaining geometry data using a plurality of processing means which processes graphics in parallel on the basis of a series of graphic commands including a primitive command which defines a graphic to be displayed and an attribute command to designate a state of the attribute of display of the graphic and displaying a graphics corresponding to the graphic commands, comprising the steps of:

receiving the series of the graphic commands including discrimination data for allocating to a fetch target;

inputting to the processing means at least those of the attribute commands which the processing means use;

causing respective processing means to update the state of the attributes of display in the appropriate processing means on a basis of the input attribute commands;

distributing the primitive command to any one of the processing means of the plurality;

generating data on the allocation of the processing means to which the primitive command is distributed; and attaching to the commands comprising the series of graphic commands corresponding marks indicative of the sequence of reception of the commands and maintaining the sequence of the series of graphic commands using the marks transferred to the geometry data when the image data is generated from the geometry data.

* * * * *